(12) United States Patent
Kobayashi

(10) Patent No.: US 7,446,948 B2
(45) Date of Patent: Nov. 4, 2008

(54) ZOOM OPTICAL SYSTEM AND IMAGING SYSTEM USING THE SAME

(75) Inventor: Yuko Kobayashi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 62 days.

(21) Appl. No.: 11/490,067

(22) Filed: Jul. 21, 2006

(65) Prior Publication Data

US 2007/0058266 A1  Mar. 15, 2007

(30) Foreign Application Priority Data

Sep. 12, 2005 (JP) ............................. 2005-263577
Sep. 12, 2005 (JP) ............................. 2005-263578

(51) Int. Cl.
*G02B 15/14* (2006.01)
(52) U.S. Cl. ...................... 359/689; 359/680
(58) Field of Classification Search ................ 359/680, 359/689, 784, 686
See application file for complete search history.

(56) References Cited

U.S. PATENT DOCUMENTS 5,305,148 A   4/1994  Ikemori et al.

6,452,729 B2 *  9/2002  Yamamoto ................... 359/676
2005/0128601 A1 *  6/2005  Minakata ...................... 359/680

FOREIGN PATENT DOCUMENTS

| JP | 64-024214 | 1/1989 |
| JP | 2002-055278 | 2/2002 |
| JP | 2003-177314 | 6/2003 |
| JP | 2004-226691 | 8/2004 |
| JP | 2005-077693 | 3/2005 |

* cited by examiner

*Primary Examiner*—Darryl J Collins
(74) *Attorney, Agent, or Firm*—Kenyon & Kenyon LLP

(57) ABSTRACT

The invention is concerned with a small-format yet high-performance zoom optical system with a fewer lenses count, and an electronic system that incorporates it. The zoom optical system comprises, in order from its object side, a first lens unit G1 of negative refracting power, a second lens unit G2 of positive refracting power and a third lens unit G3 of negative refracting power, in which zooming is implemented by movement of at least the second lens unit G2 and the third lens unit G3, thereby varying a space between adjacent lens units. The negative first lens unit G1 is composed of one negative lens, the positive second lens unit G2 is composed of one positive lens, and the negative third lens unit G3 is composed of one negative lens. The negative lens in the third lens unit G3 is in a negative meniscus shape with a concave surface on its image plane side.

22 Claims, 17 Drawing Sheets

ZOOM OPTICAL SYSTEM AND IMAGING SYSTEM USING THE SAME

This application claims the benefits of Japanese Application Nos. 2005-263577 and 2005-263578 filed in Japan on Sep. 12, 2005, the contents of which are incorporated hereby by this reference.

BACKGROUND OF THE INVENTION

The present invention relates generally to a zoom optical system and an imaging system that incorporates it, and more particularly to a compact zoom optical system and electronic equipment including such a compact zoom optical system (which is designed to be built in or on, for instance, digital cameras, video cameras, digital video units, personal computers, mobile computers, cellular phones, and personal digital assistants).

In recent years, personal digital assistants called PDAs and cellular phones have enjoyed a burst of popularity, and there has been a growth in the use of systems with built-in compact digital cameras or digital video units using as imaging devices CCD (charge coupled device) sensors or CMOS (complementary metal oxide semiconductor) sensors as well. More recently, imaging devices having a lot more pixels (megapixel), albeit being of relatively compact size, have been developed and, with them, compact yet high-performance optical systems have been in great need.

One typical prior art optical system of small size is set forth in Patent Publication 1 or Patent Publication 2. This is a zoom optical system comprising three units of negative, positive and positive powers, each composed of one lens. Patent Publication 3 shows a small-format zoom optical system with negative power at the front unit. Patent Publication 4 or Patent Publication 5 teaches a zoom optical system comprising three units of negative, positive and negative powers, each composed of one lens.

Further, Patent Publication 6 sets forth one typical small-format zoom optical system for electronic equipment. This is a zoom optical system comprising three units of negative, positive and negative or negative, positive and positive powers, each composed of one lens, wherein the second lens unit and the third lens unit are moved for zooming. Furthermore, many other zoom optical systems using an optical element with variable refracting power have been proposed in the art. For instance, Patent Publication 7 has put forward a zoom optical system with negative power at the front unit, which employs an optical element with variable refracting power.

Patent Publication 1
JP-A-2002-55278
Patent Publication 2
JP-A-2003-177314
Patent Publication 3
JP-A-2004-226691
Patent Publication 4
JP-A-3-260611
Patent Publication 5
JP-A-2004-133058
Patent Publication 6
JP-A-2004-226691
Patent Publication 7
JP-A-64-24214
Patent Publication 8
JP-A-2001-272646

SUMMARY OF THE INVENTION

The present invention provides a small-format yet high-performance zoom optical system with a fewer lenses count, and an electronic system incorporating the same.

According to the first aspect of the invention, there is provided a zoom optical system comprising, in order from an object side thereof, a first lens unit of negative refracting power, a second lens unit of positive refracting power and a third lens unit of negative refracting power, wherein zooming is implemented by movement of at least the second lens unit and the third lens unit thereby varying a space between adjacent lens units, characterized in that:

said negative first lens unit is composed of one negative lens element, said positive second lens unit is composed of one positive lens element, said negative third lens unit is composed of one negative lens element, a total number of lenses from the first to the third lens unit in said zoom optical system is 3, and the negative lens element in said third lens unit is of negative meniscus shape with a concave surface on an image plane side.

The advantages of, and requirements for, the first zoom optical system as arranged above are now explained.

For an optical system mounted on electronic equipment it is required to have a relatively long back focus, because there are an imaging device and filters located on the image side. The optical system favorable to this end is optimally of the retrofocus architecture with negative power at the front.

In the invention, the location of negative refracting power in the first lens unit provides the architecture favorable for obtaining a wide-angle arrangement and a relatively long back focus. Composing each lens unit of one lens helps cut back the whole length of the optical system upon received in an associated lens casing. The second lens unit having a substantial power of the optical system is composed of a lens having a strong positive refracting power, so that negatively acting aberrations occurring at the negative lens in the first lens unit can be well corrected. With the third lens unit composed of one lens having negative refracting power, it is possible to make good correction of aberrations, especially off-axis aberrations, remaining undercorrected by the positive lens in the second lens unit. Here composing the third lens unit of one positive lens is not preferable because, in view of correction of aberrations, the second lens unit must have a positive lens and a negative lens, which render the second lens unit bulky, otherwise leading to an increase in the whole size of the optical system. Further in the invention, the negative lens in the third lens unit is configured into negative meniscus shape with a concave surface on the image plane side, so that the principal point positions can be set more to the rear to space the third lens unit suitably away from an image plane, thereby slimming down the third lens unit and ensuring a back focus long enough to receive filters and an imaging device.

In the zoom optical system of the invention as described above, it is desired for the shape factor of the negative lens in the third lens unit to satisfy the following condition (1).

$$0.7 < (r_6 + r_7)/(r_6 - r_7) < 2.0 \tag{1}$$

Here, $r_6$ and $r_7$ are the axial radii of curvature of the object side-surface and the image plane side-surface of the negative lens in the third lens unit, respectively.

In the invention, the lens of negative refracting power that forms the third lens unit is configured into negative meniscus shape with a concave surface on the image plane side. Here if the shape factor of that lens is allowed to satisfy condition (1), it is then possible to make good correction of off-axis aberrations in general, and field curvature and coma in particular. Exceeding the upper limit of 2.0 to condition (1) is not preferable, because there are a lot more aberrations occurring at $r_7$ that is the image plane side-surface, and it is difficult to correct off-axis aberrations, especially field curvature. As the lower limit of 0.7 is not reached, it causes the negative refracting power of the third lens unit to become too weak to correct aberrations at the third lens unit.

Preferably in the invention, the shape factor of the negative lens in the third lens unit should come within the range of the following condition (1-2), because off-axis aberrations, especially field curvature and coma can be much more corrected.

$$0.85<(r_6+r_7)/(r_6-r_7)<1.6 \quad (1\text{-}2)$$

More preferably, $$1.0<(r_6+r_7)/(r_6-r_7)<1.6 \quad (1\text{-}3)$$

It is also desired for the whole lens length to satisfy the following condition (2).

$$1.9<TL_w/f_w<3.1 \quad (2)$$

Here, $TL_w$ is the whole lens length of the optical system at a wide-angle end (the length from the first surface to the image plane), and $f_w$ is the focal length of the whole optical system at the wide-angle end.

As the lower limit of 1.9 to condition (2) is not reached, it renders it difficult to ensure the desired back focus, resulting in a failure in gaining space enough to receive an imaging device unit and filters. Exceeding the upper limit of 3.1 may work for getting hold of performance, but it is not preferable, because the optical system grows too large, failing to provide a small-format optical system.

It is further desired to satisfy the following condition (3) with respect to the refracting powers of the first lens unit and the second lens unit.

$$1.8<|f_1|/f_2<6.5 \quad (3)$$

Here, $f_1$ is the focal length of the first lens unit, and $f_2$ is the focal length of the second lens unit.

As the upper limit of 6.5 to condition (3) is exceeded, it may work for reducing the whole size of the zoom optical system because the refracting power of the second lens unit grows strong, but it works against correction of aberrations because there are a lot more aberrations occurring within the second lens unit. Much difficulty is encountered in correction of coma in particular, failing to ensure high image quality performance. Falling short of the lower limit of 1.8 is not preferable, because the refracting power of the second lens unit becomes too weak to make good correction of aberrations occurring at the first lens unit. Much difficulty is encountered in correction of off-axis aberration that is field curvature in particular, failing to ensure high image quality performance.

Preferably in the invention, the refracting powers of the first lens unit and the second lens unit should come within the range of the following condition (3-2), because of being capable of better correction of spherical aberrations and off-axis field curvature at the telephoto end.

$$1.9<|f_1(t)|/f_2<2.8 \quad (3\text{-}2)$$

Here, $f_1(t)$ is the focal length of the first lens unit at the telephoto end, and $f_2$ is the focal length of the second lens unit.

For the negative lens that forms the third lens unit, it is desired to satisfy the following condition (4).

$$0.4<r_7/f_w<1.0 \quad (4)$$

Here, $r_7$ is the axial radius of curvature of the image side-surface of the negative lens in the third lens unit, and $f_w$ is the focal length of the whole optical system at the wide-angle end.

As the lower limit of 0.4 to condition (4) is not reached, it causes a lot more coma to occur at the image side-surface of the negative lens in the third lens unit, which may otherwise render the performance of its peripheral edge worse. Exceeding the upper limit of 1.0 is not preferable, because negative component aberrations at that surface become too small with the result that positive component spherical aberrations occurring at other lens elements remain undercorrected.

It is also desired to satisfy the following condition (5).

$$0.4<(G23L)/Y'<1.1 \quad (5)$$

Here, $Y'$ is the maximum image height (half the diagonal length of an effective imaging area), and $G23L$ is the total axial thickness of all the lens elements included in the second lens unit and the third lens unit.

Exceeding the upper limit to 1.1 to condition (5) causes an increase in the whole length of the second lens unit, which may otherwise give rise to an increase in the whole size of the optical system. Falling below the lower limit of 0.4 is not preferable in view of processing and assembling, because although it may work for smaller size, the lens becomes thin relative to diameter, apt to break down or so.

Desirously, the negative lens in the first lens unit is a variable refracting power lens.

In the invention, if the negative refracting power lens that is the first lens unit is composed of a variable refracting power lens, the amount of negatively acting aberrations occurring within the first lens unit is so controlled that they can be well corrected all over the zooming zone. More specifically, on the wide-angle side, the negative refracting power of the first lens unit is attenuated in such a way as to take on the zooming effect of the optical system simultaneously with good correction of distortion that grows large in a minus direction at the wide-angle end, whereas, on the telephoto side, the negative refracting power of the first lens unit is augmented in such a way as to take on the zooming effect of the optical system simultaneously with good correction of spherical aberrations that grow large in a minus direction at the telephoto end.

When the variable refracting power optical element is used for the negative lens in the first lens unit, it should satisfy the following condition (6).

$$0.07<|\phi_1|<0.27 \quad (6)$$

Here, $\phi_1$ is the refracting power of the variable refracting power optical element.

As the upper limit of 0.27 to condition (6) is exceeded, it causes the refracting power of that variable refracting power optical element to become too strong to make correction of off-axis aberrations, especially distortion, etc. at the wide-angle end. As the lower limit of 0.07 is not reached, it results in too long a full length and larger size.

Focusing is preferably implemented by the movement of the negative lens in the first lens unit.

Implementing focusing by the movement of the negative first lens that is the first lens unit is preferable, because there are much less aberration fluctuations with varying distance.

When the variable refracting power optical element is used for the negative lens in the first lens unit, focusing could be implemented by varying the refracting power of that variable refracting power optical element. In this case, any movable unit mechanism for focusing can be dispensed with, making simpler lens barrel architecture possible.

The first aspect of the invention is understood to encompass an imaging system comprising any one of the zoom optical systems as described above and an imaging device located on the image side of the zoom optical system. Through such architecture, it is possible to obtain advantages similar to those of the above zoom optical system.

Reference is next made to the second aspect of the invention, according to which there is provided a zoom optical system comprising, in order from an object side thereof, a first lens unit of negative refracting power, a second lens unit of positive refracting power and a third lens unit of negative refracting power, wherein zooming is implemented by movement of at least the second lens unit and the third lens unit thereby varying a space between adjacent lens units, characterized in that:

said first lens unit comprises at least one variable refracting power optical element.

The advantages of, and the requirements for, the second zoom optical system as arranged above are now explained.

In the invention, the location of negative refracting power in the first lens unit provides the architecture favorable for obtaining a wide-angle arrangement and a relatively long back focus. Composing the second lens unit of a lens unit having a relatively strong positive refracting power contributes to good correction of negatively acting aberrations occurring at the negative lens in the first lens unit. With the third lens unit composed of a lens unit having negative refracting power, it is possible to make good correction of aberrations, especially off-axis aberrations, remaining undercorrected by the positive lens in the second lens unit. Further, composing the third lens unit of a lens unit having negative refracting power allows the principal point positions of the second lens unit and the third lens unit to be located more in the front, so that the whole length of the optical system can be cut back.

Further in the invention, at least one variable refracting power optical element is used in the first lens unit of negative refracting power to take on the zooming effect and, at the same time, control the amount of aberrations occurring within the first lens unit, so that good optical performance is achievable over a wide range from the wide-angle end to the telephoto end.

For the zoom optical system of the invention as described above, it is desired that the first lens unit having negative refracting power and comprising the variable refracting power optical element satisfy the following condition (7).

$$1.15 < |f_1(w)/f_1(t)| < 3.2 \qquad (7)$$

Here, $f_1(w)$ is the focal length of the first lens unit at the wide-angle end, and $f_1(t)$ is the focal length of the first lens unit at the telephoto end.

In the invention, the variable refracting power optical element is used in the first lens unit, and the negative refracting power of the first lens unit is designed to grow strong from the wide-angle end toward the telephoto end. More specifically, on the wide-angle side, the negative refracting power of the first lens unit is attenuated in such a way as to take on the zooming effect of the optical system simultaneously with good correction of distortion that grows large in a minus direction at the wide-angle end, whereas, on the telephoto side, the negative refracting power of the first lens unit is augmented in such a way as to take on the zooming effect of the optical system simultaneously with good correction of spherical aberrations that grow large in a minus direction at the telephoto end. It is thus possible to achieve high image quality optical performance over a wide range from the wide-angle wise to the telephoto side.

Falling below the lower limit of 1.15 to condition (7) is not preferable, because the zooming effect made up for by the first lens unit becomes slender; the refracting power of each unit becomes too strong to correct aberration fluctuations with zooming. Exceeding the upper limit of 3.2 to condition (7) is again not preferable, because it renders it difficult to correct various aberrations in general, and off-axis aberrations, field curvature and coma at the wide-angle end in particular, failing to ensure off-axis performance.

More preferably, the refracting power of the first lens unit should come within the range of the following condition (7-2), because various aberrations, especially off-axis field curvature and coma can be much more corrected.

$$1.25 < |f_1(w)/f_1(t)| < 2.7 \qquad (7\text{-}2)$$

It is also desirable for the refracting powers of the first lens unit and the second lens unit to satisfy the following condition (3).

$$1.8 < |f_1|/f_2 < 6.5 \qquad (3)$$

Here, $f_1$ is the focal length of the first lens unit, and $f_2$ is the focal length of the second lens unit.

As the upper limit of 6.5 to condition (3) is exceeded, it may work for reducing the whole size of the zoom optical system because the refracting power of the second lens unit grows strong, but it works against correction of aberrations because there are a lot more aberrations occurring within the second lens unit. Much difficulty is encountered in correction of coma in particular, failing to ensure high image quality performance. Falling short of the lower limit of 1.8 is not preferable, because the refracting power of the second lens unit becomes too weak to make good correction of aberrations occurring at the first lens unit. Much difficulty is encountered in correction of off-axis aberration field curvature in particular, failing to ensure high image quality performance.

Preferably in the invention, the refracting powers of the first lens unit and the second lens unit should come within the range of the following condition (3-2), because of better correction of spherical aberrations and off-axis field curvature at the telephoto end.

$$1.9 < |f_1(t)|/f_2 < 2.8 \qquad (3\text{-}2)$$

Here, $f_1(t)$ is the focal length of the first lens unit at the telephoto end, and $f_2$ is the focal length of the second lens unit.

Further in the invention, it is desired that the negative first lens unit be composed of one negative lens, the positive second lens unit be composed of one positive lens, the negative third lens unit be composed of one negative lens, and the negative lens in the third lens unit be in a negative meniscus shape with a concave surface on the image plane side.

Composing each lens unit of one lens enables the whole length of the optical system to be much more shortened. Composing the second lens unit of a lens having a relatively strong positive refracting power enables negatively acting aberrations occurring at the negative lens in the first lens unit to be well corrected. With the third lens unit composed of one lens having negative refracting power, it is possible to make good correction of various aberrations, especially off-axis various aberrations, which remain undercorrected by the positive lens in the second lens unit. Here composing the third lens unit of one positive lens is not preferable because, in view of correction of aberrations, the second lens unit must have a positive lens and a negative lens, which render the second lens unit bulky, otherwise leading to an increase in the whole size of the optical system.

Further in the invention, the negative lens in the third lens unit is configured into a negative meniscus shape with a concave surface on the image plane side, so that the principal point positions can be set more to the rear, thereby ensuring a back focus long enough to receive filters and an imaging device.

Furthermore, it is desired for the shape factor of the negative lens in the third lens unit to satisfy the following condition (1).

$$0.7<(r_6+r_7)/(r_6-r_7)<2.0 \tag{1}$$

Here, $r_6$ and $r_7$ are the axial radii of curvature of the object side-surface and the image plane side-surface of the negative lens in the third lens unit, respectively.

In the invention, the lens of negative refracting power that forms the third lens unit is configured into a negative meniscus shape with a concave surface on the image plane side. Here, if the shape factor of that lens is allowed to satisfy condition (1), it is then possible to make good correction of off-axis aberrations in general, and field curvature and coma in particular. Exceeding the upper limit of 2.0 to condition (1) is not preferable, because there are a lot more aberrations occurring at $r_7$ that is the image plane side-surface, and it is difficult to correct off-axis aberrations, especially field curvature. As the lower limit of 0.7 is not reached, it causes the negative refracting power of the third lens unit to become too weak to correct aberrations at the third lens unit.

Preferably in the invention, the shape factor of the negative lens in the third lens unit should come within the range of the following condition (1-2), because off-axis aberrations, especially field curvature and coma can be much more corrected.

$$0.85<(r_6+r_7)/(r_6-r_7)<1.6 \tag{1-2}$$

More preferably, $$1.0<(r_6+r_7)/(r_6-r_7)<1.6 \tag{1-3}$$

For the negative lens that forms the third lens unit, it is desired to satisfy the following condition (4).

$$0.4<r_7/f_w<1.0 \tag{4}$$

Here, $r_7$ is the axial radius of curvature of the image side-surface of the negative lens in the third lens unit, and $f_w$ is the focal length of the whole optical system at the wide-angle end.

As the lower limit of 0.4 to condition (4) is not reached, it causes a lot more coma to occur at the image side-surface of the negative lens in the third lens unit, which may otherwise render the performance of its peripheral edge worse. Exceeding the upper limit of 1.0 is not preferable, because negative component aberrations at that surface become too small with the result that positive component spherical aberrations occurring at other lens elements remain undercorrected.

It is also desired to satisfy the following condition (8).

$$0.4<(G23L)/Y'<0.9 \tag{8}$$

Here, Y' is the maximum image height (half the diagonal length of an effective imaging area), and G23L is the total axial thickness of all the lens elements included in the second lens unit and the third lens unit.

Exceeding the upper limit to 0.9 to condition (8) causes an increase in the whole length of the second lens unit, which may otherwise give rise to an increase in the whole size of the optical system. Falling below the lower limit of 0.4 is not preferable in view of processing and assembling, because although it may work for smaller size, the lens becomes thin relative to diameter, apt to break down or so.

Desirously, the variable refracting power optical element satisfies the following condition (6).

$$0.07<|\phi_1|<0.27 \tag{6}$$

Here, $\phi_1$ is the refracting power of the variable refracting power optical element.

As the upper limit of 0.27 to condition (6) is exceeded, it causes the refracting power of that variable refracting power optical element to become too strong to make correction of off-axis aberrations, especially distortion, etc. at the wide-angle end. As the lower limit of 0.07 is not reached, it results in too long a full length and larger size.

Focusing is preferably implemented by the movement of the negative lens in the first lens unit.

Implementing focusing by the movement of the negative first lens that is the first lens unit is preferable, because there are much less aberration fluctuations with varying distance.

Focusing is also preferably implemented by varying the refracting power of that variable refracting power optical element. In this case, any movable unit mechanism for focusing can be dispensed with, making simpler lens barrel architecture possible.

The second aspect of the invention is understood to encompass an imaging system comprising any one of the zoom optical systems as described above and an imaging device located on the image side of the zoom optical system. Through such architecture, it is possible to obtain advantages similar to those of the above zoom optical system.

As described above, the present invention provides a small-format yet high-performance zoom optical system with a fewer lenses count, and an electronic system incorporating the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPRTION OF THE PREFERRED EMBODIMENTS

Examples 1-6 of the inventive zoom optical system are now given below. FIGS. 1-6 are illustrative in lens arrangement section of Examples 1-6 of the inventive zoom optical system at the wide-angle ends (a), in the intermediate settings (b) and at the telephoto ends (c) upon focusing on an object point at infinity. Throughout the drawings, G1 stands for the first lens unit, S an aperture stop, G2 the second lens unit, G3 the third lens unit, F a plane-parallel plate that forms a low-pass filter having a wavelength limiting coating for limiting infrared light, etc., and I an image plane.

Examples 1-6 are each directed to a zoom optical system for electronic equipment having an imaging device height of about 2.3 mm. Each is made up of, in order from its object side, a negative refracting power lens with a concave surface on its image plane side, a stop, a double-convex positive refracting power lens, and a negative refracting power meniscus lens with a concave surface on its image side. For zooming, the second lens unit G2 and the third lens unit G3 are moved thereby varying a space between adjacent lenses.

Note here that the first negative lens that forms the first lens-unit G1 in Example 1, 2, 5, and 6 is a liquid crystal lens (variable refracting power element) having a refracting power varying with zooming. For that liquid crystal lens, the one set forth in Patent Publication 8 could be used.

In Example 3, distortion is supposed to be corrected by image processing or the like after reception of light at an electronic imaging device.

Note again that the first negative lens that forms the first lens unit G1 in Example 4 is a liquid crystal lens (variable shape element) having a shape changing with zooming.

Figure 1A:
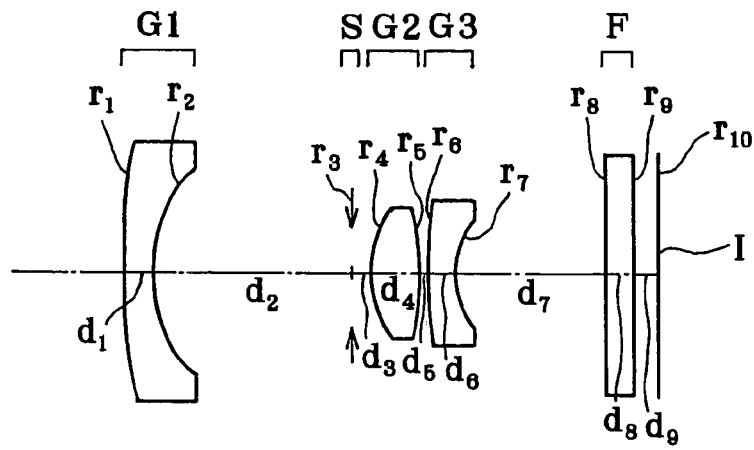
FIG. 1 is illustrative in lens arrangement section of Example 1 of the inventive optical system at a wide-angle end (a), an intermediate setting (b) and a telephoto end (c) upon focusing on an object point at infinity.
Figure 1B:
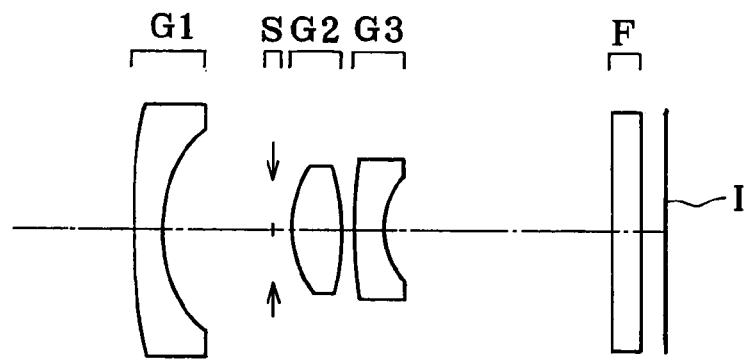
Figure 1C:
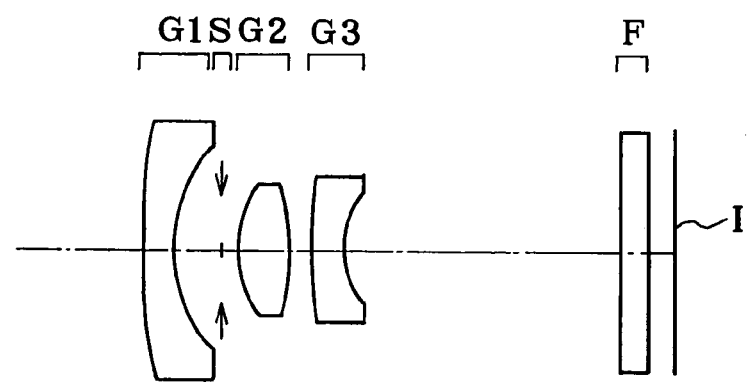

As depicted in FIG. 1, the zoom optical system of Example 1 is made up of, in order from its object side, the first lens unit G1 having negative refracting power, the aperture stop S, the second lens unit G2 having positive refracting power and the third lens unit G3 having negative refracting power. Upon zooming from the wide-angle end to the telephoto end, the first lens unit G1 remains fixed, the second lens unit G2 moves toward the object side in unison with the aperture stop S, and the third lens unit G3 moves toward the object side while its space with the second lens unit G2 becomes wide.

In order from the object side, the first lens unit G1 is composed of a negative meniscus lens having a convex surface on its object side, with its refractive index growing high with zooming from the wide-angle end to the telephoto end. The second lens unit G2 is composed of a double-convex positive lens, and the third lens unit G3 is composed of a negative meniscus lens having a convex surface on its object side. Five aspheric surfaces are used: two at both surfaces of the negative meniscus lens in the first lens unit G1, two at both surfaces of the double-convex positive lens in the second lens unit G2, and one at the image plane side-surface of the negative meniscus lens in the third lens unit G3.

Figure 2A:
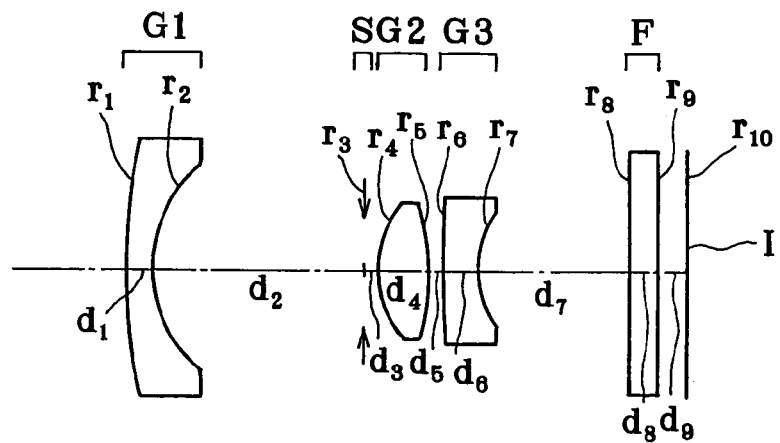
FIG. 2 is illustrative in lens arrangement section, as in FIG. 1, of Example 2.
Figure 2B:
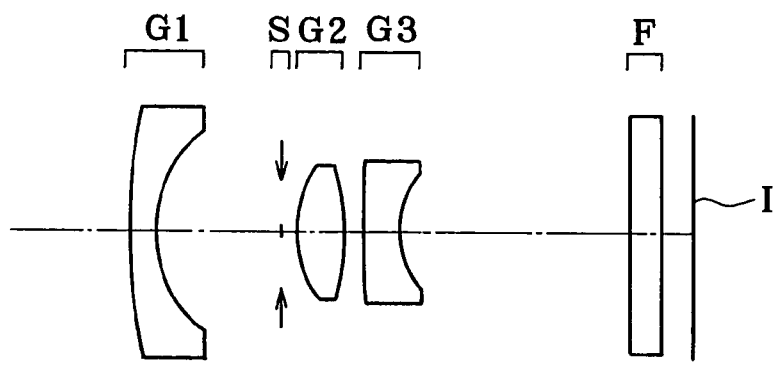
Figure 2C:
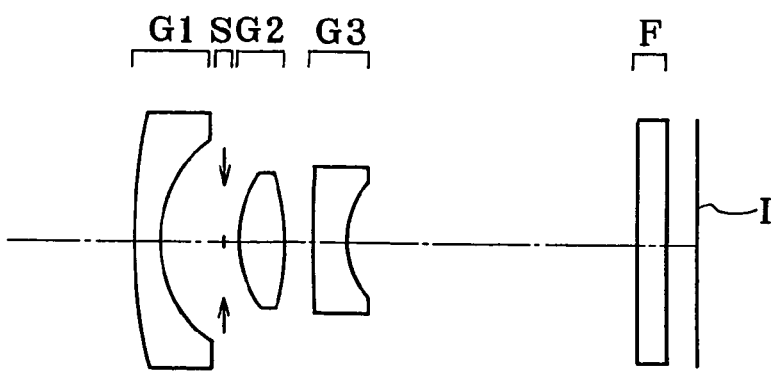

As depicted in FIG. 2, the zoom optical system of Example 2 is made up of, in order from its object side, the first lens unit G1 having negative refracting power, the aperture stop S, the second lens unit G2 having positive refracting power and the third lens unit G3 having negative refracting power. Upon zooming from the wide-angle end to the telephoto end, the first lens unit G1 remains fixed, the second lens unit G2 moves toward the object side in unison with the aperture stop S, and the third lens unit G3 moves toward the object side while its space with the second lens unit G2 becomes wide.

In order from the object side, the first lens unit G1 is composed of a negative meniscus lens having a convex surface on its object side, with its refractive index growing high with zooming from the wide-angle end to the telephoto end. The second lens unit G2 is composed of a double-convex positive lens, and the third lens unit G3 is composed of a negative meniscus lens having a convex surface on its object side. Five aspheric surfaces are used: two at both surfaces of the negative meniscus lens in the first lens unit G1, two at both surfaces of the double-convex positive lens in the second lens unit G2, and one at the image plane side-surface of the negative meniscus lens in the third lens unit G3.

Figure 3A:
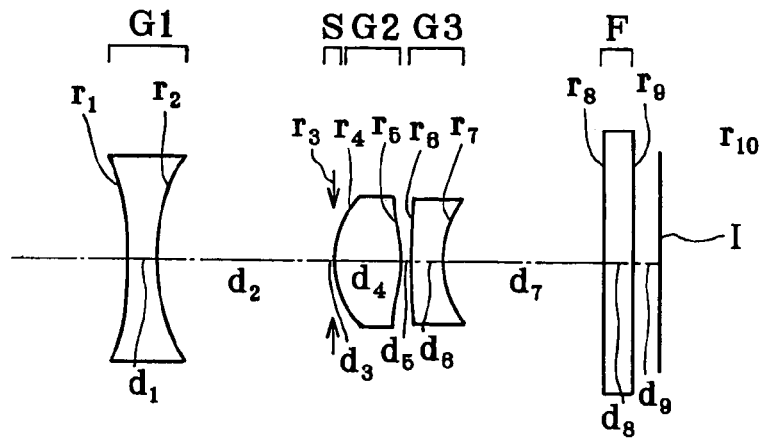
FIG. 3 is illustrative in lens arrangement section, as in FIG. 1, of Example 3.
Figure 3B:
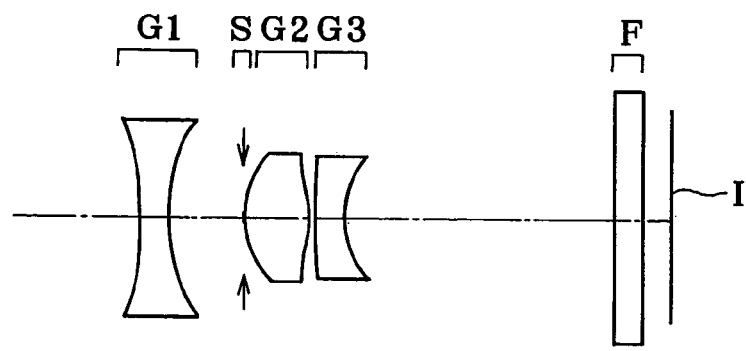
Figure 3C:
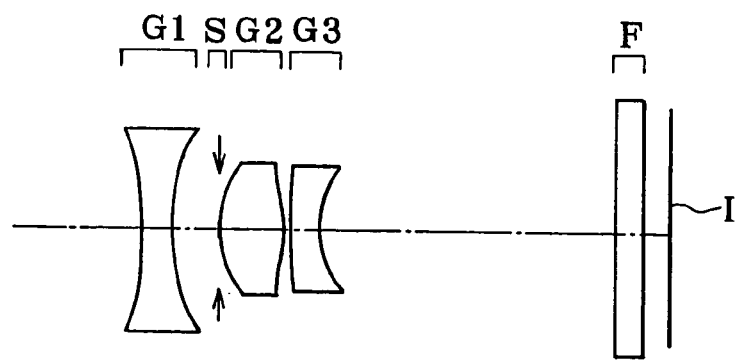

As depicted in FIG. 3, the zoom optical system of Example 3 is made up of, in order from its object side, the first lens unit G1 having negative refracting power, the aperture stop S, the second lens unit G2 having positive refracting power and the third lens unit G3 having negative refracting power. Upon zooming from the wide-angle end to the telephoto end, the first lens unit G1 remains fixed, the second lens unit G2 moves toward the object side in unison with the aperture stop S, and the third lens unit G3 moves toward the object side while its space with the second lens unit G2 becomes first narrow and then wide.

In order from the object side, the first lens unit G1 is composed of a negative meniscus lens having a convex surface on its object side, the second lens unit G2 is composed of a double-convex positive lens, and the third lens unit G3 is composed of a negative meniscus lens having a convex surface on its object side. Five aspheric surfaces are used: two at both surfaces of the negative meniscus lens in the first lens unit G1, two at both surfaces of the double-convex positive lens in the second lens unit G2, and one at the image plane side-surface of the negative meniscus lens in the third lens unit G3.

Figure 4A:
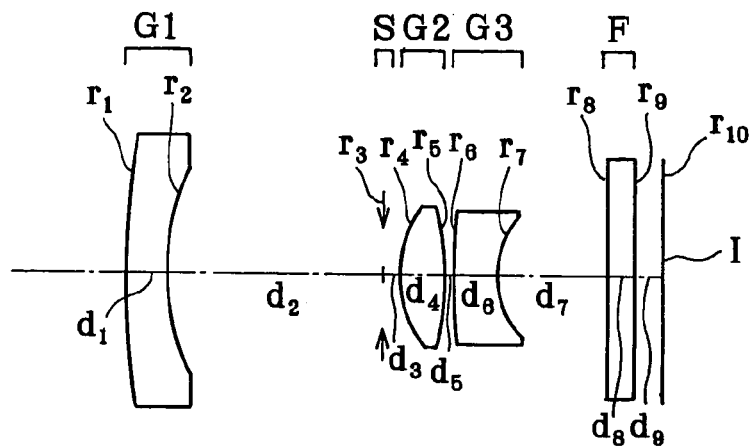
FIG. 4 is illustrative in lens arrangement section, as in FIG. 1, of Example 4.
Figure 4B:
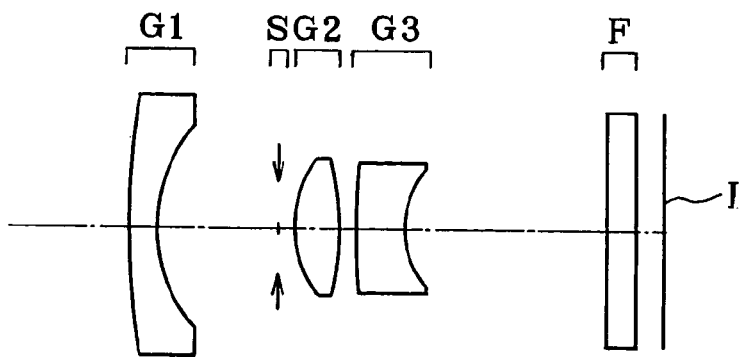
Figure 4C:
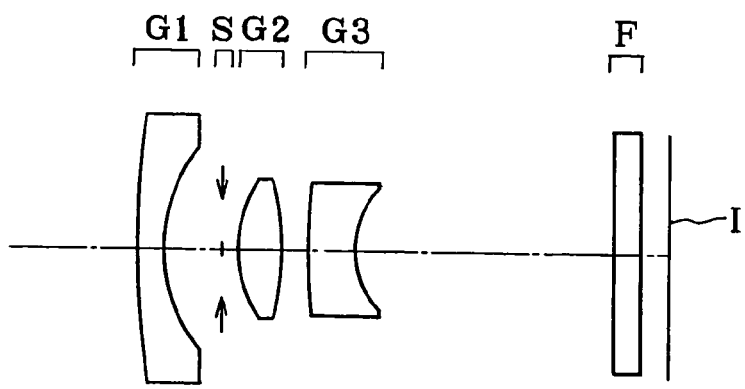

As depicted in FIG. 4, the zoom optical system of Example 4 is made up of, in order from its object side, the first lens unit G1 having negative refracting power, the aperture stop S, the second lens unit G2 having positive refracting power and the third lens unit G3 having negative refracting power. Upon zooming from the wide-angle end to the telephoto end, the first lens unit G1 remains fixed, the second lens unit G2 moves toward the object side in unison with the aperture stop S, and the third lens unit G3 moves toward the object side while its space with the second lens unit G2 becomes wide.

In order from the object side, the first lens unit G1 is composed of a negative meniscus lens having a convex surface on its object side, wherein the radius of curvature of the second surface decreases with zooming from the wide-angle end to the telephoto end, and the space between the first surface and the second surface becomes narrow, too. The second lens unit G2 is composed of a double-convex positive lens, and the third lens unit G3 is composed of a negative meniscus lens having a convex surface on its object side. Five aspheric surfaces are used: two at both surfaces of the negative meniscus lens in the first lens unit G1, two at both surfaces of the double-convex positive lens in the second lens unit G2, and one at the image plane side-surface of the negative meniscus lens in the third lens unit G3.

Figure 5A:
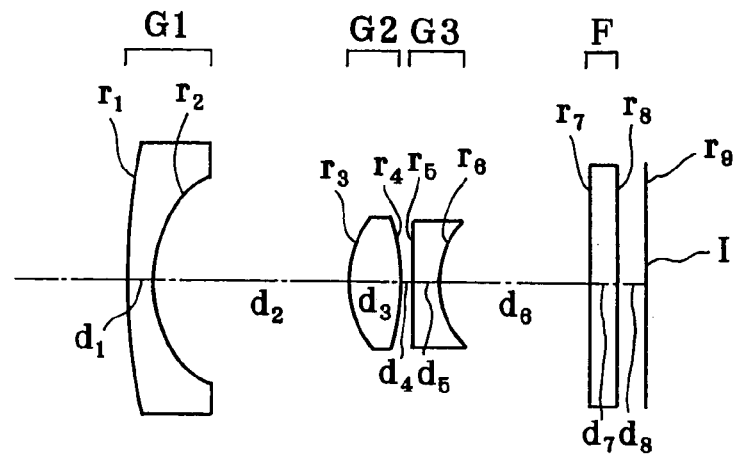
FIG. 5 is illustrative in lens arrangement section, as in FIG. 1, of Example 5.
Figure 5B:
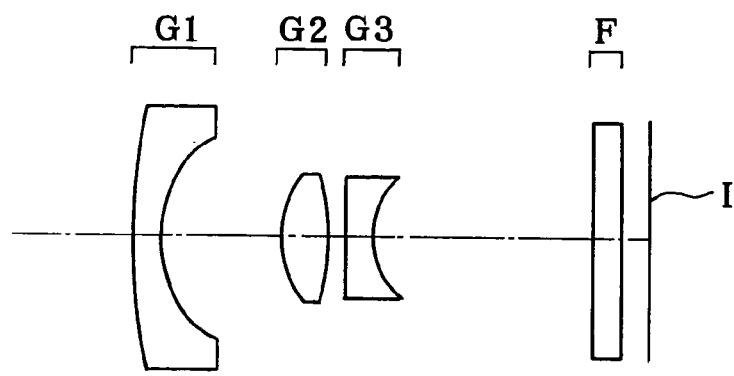
Figure 5C:
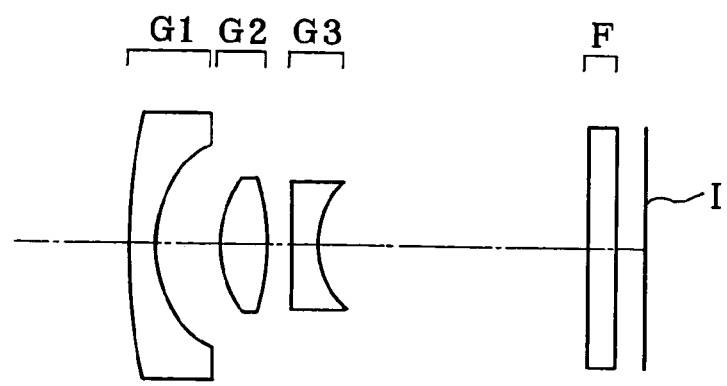

As depicted in FIG. 5, the zoom optical system of Example 5 is made up of, in order from its object side, the first lens unit G1 having negative refracting power, the second lens unit G2 having positive refracting power and the third lens unit G3 having negative refracting power, while the aperture stop S is located on the object side-surface of the double-convex positive lens that forms the second lens unit G2. Upon zooming from the wide-angle end to the telephoto end, the first lens unit G1 remains fixed, the second lens unit G2 moves toward the object side, and the third lens unit G3 moves toward the object side while its space with the second lens unit G2 becomes wide.

In order from the object side, the first lens unit G1 is composed of a negative meniscus lens having a convex surface on its object side, with its refractive index growing high with zooming from the wide-angle end to the telephoto end. The second lens unit G2 is composed of a double-convex positive lens, and the third lens unit G3 is composed of a negative meniscus lens having a convex surface on its object side. Five aspheric surfaces are used: two at both surfaces of the negative meniscus lens in the first lens unit G1, two at both surfaces of the double-convex positive lens in the second lens unit G2, and one at the image plane side-surface of the negative meniscus lens in the third lens unit G3.

Figure 6A:
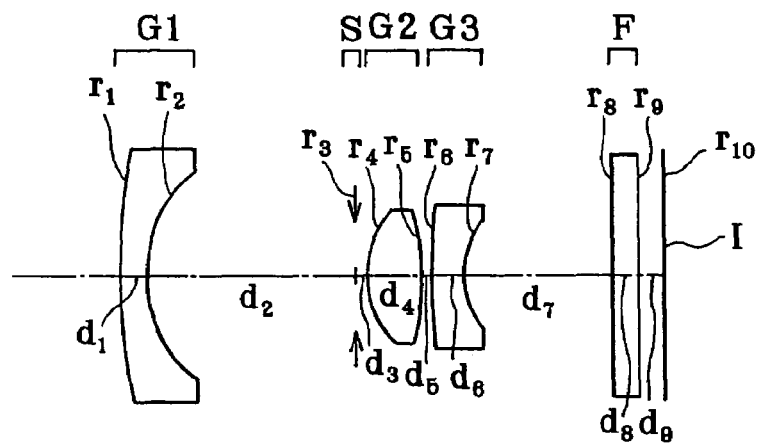
FIG. 6 is illustrative in lens arrangement section, as in FIG. 1, of Example 6.
Figure 6B:
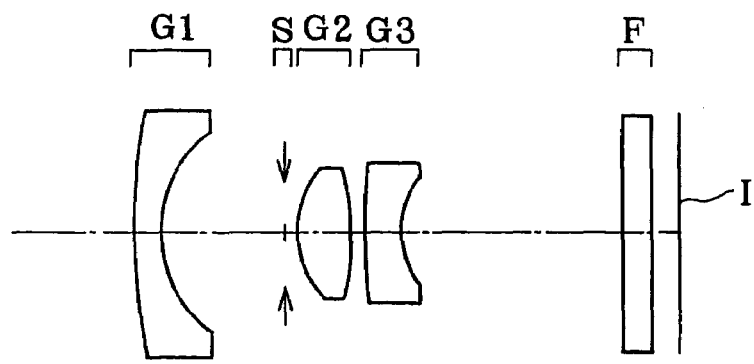
Figure 6C:
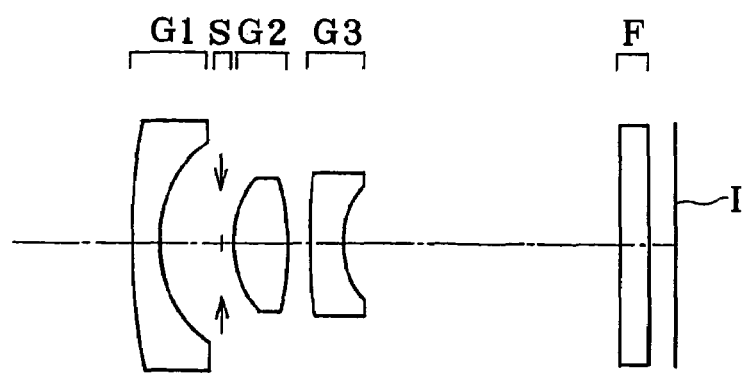
Figure 7A:
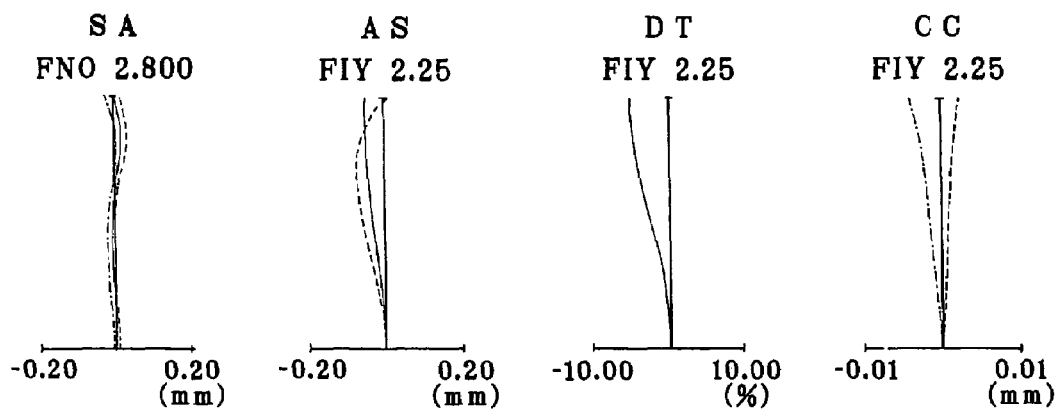
FIG. 7 is an aberration diagram for Example 1 upon focusing on an object point at infinity.
Figure 7B:
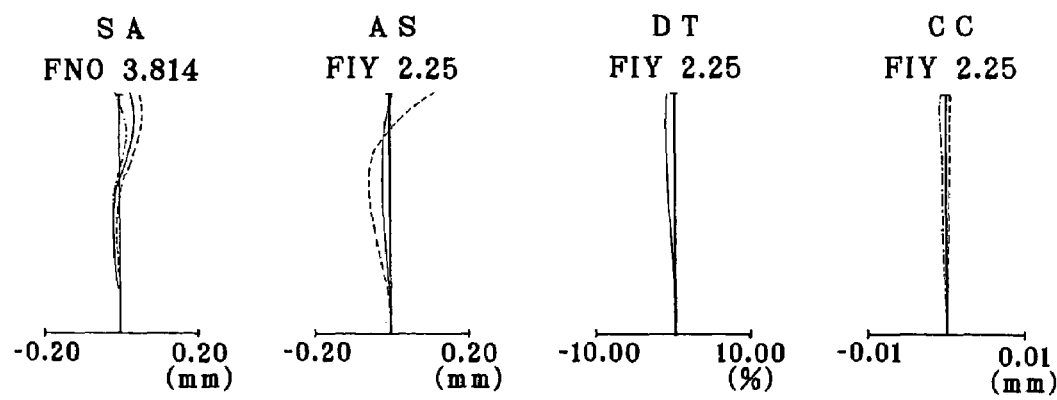
Figure 7C:
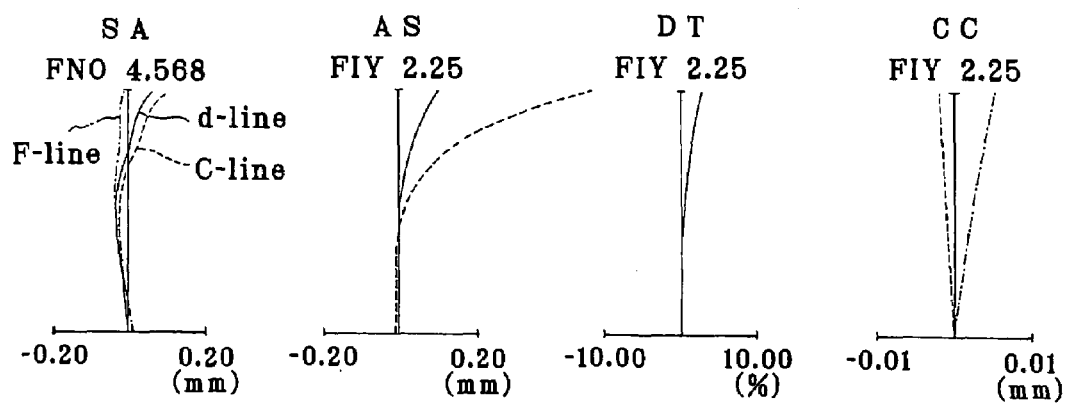
Figure 8A:
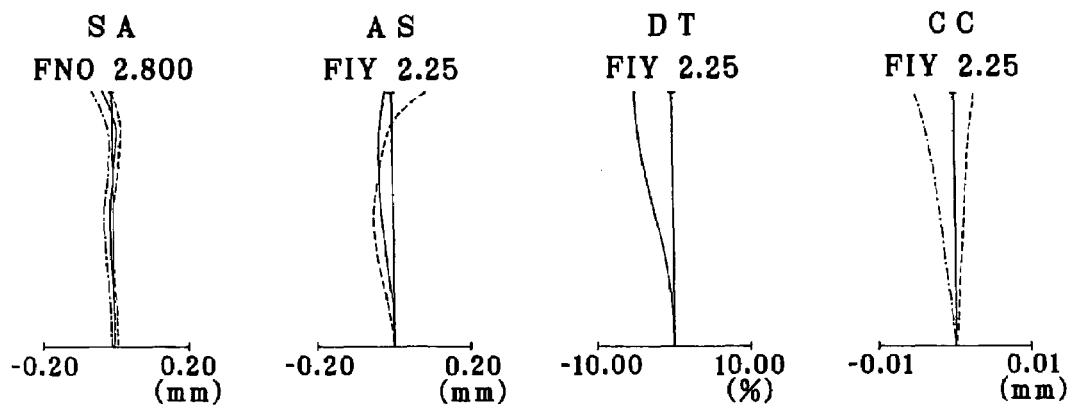
FIG. 8 is an aberration diagram for Example 2 upon focusing on an object point at infinity.
Figure 8B:
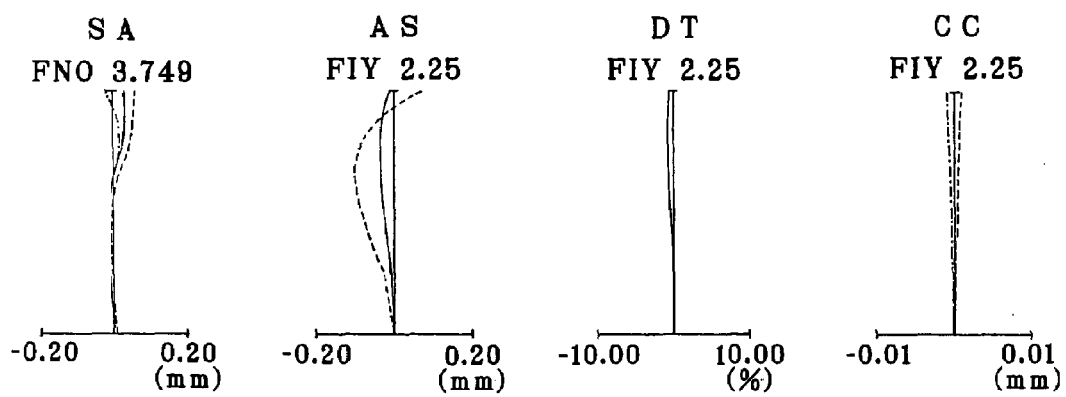
Figure 8C:
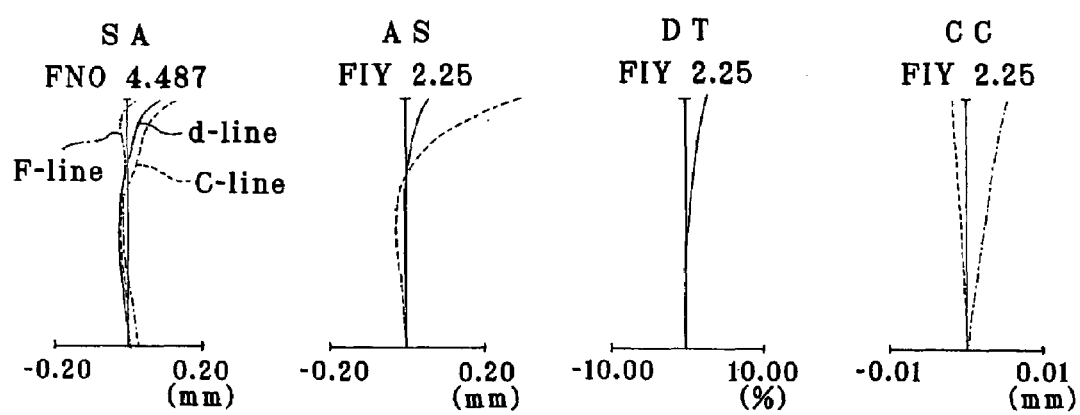
Figure 9A:
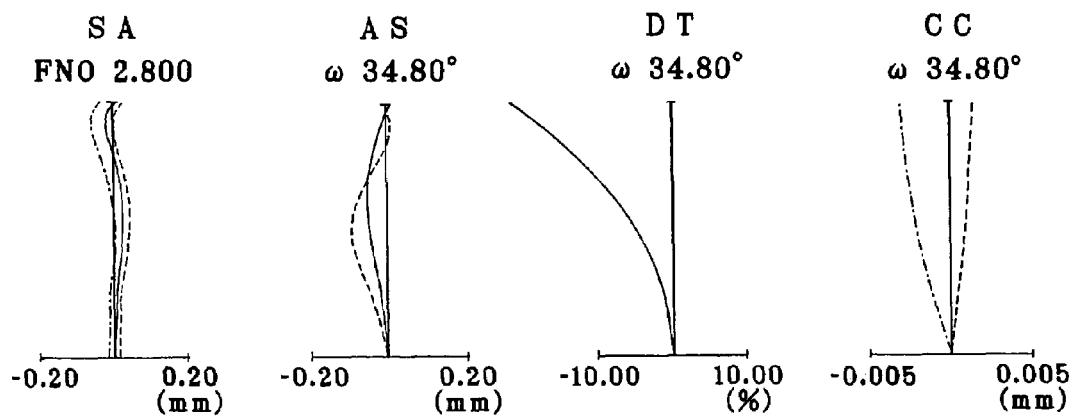
FIG. 9 is an aberration diagram for Example 3 upon focusing on an object point at infinity.
Figure 9B:
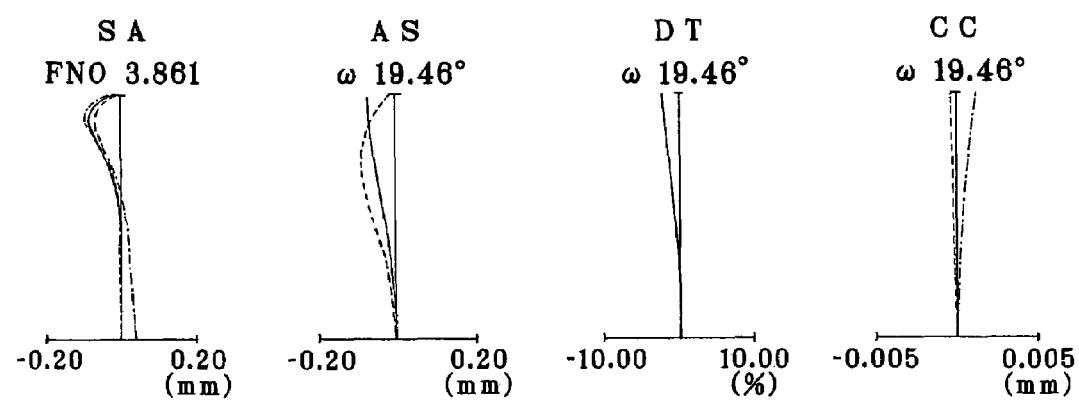
Figure 9C:
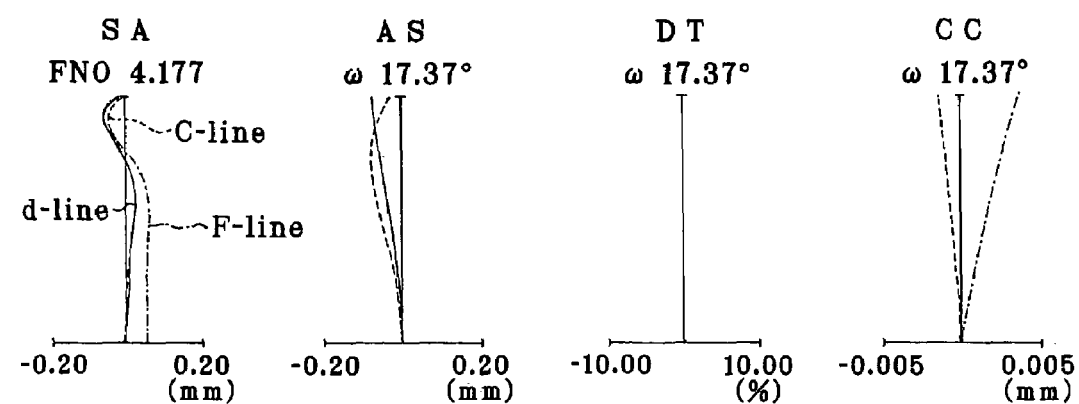
Figure 10A:
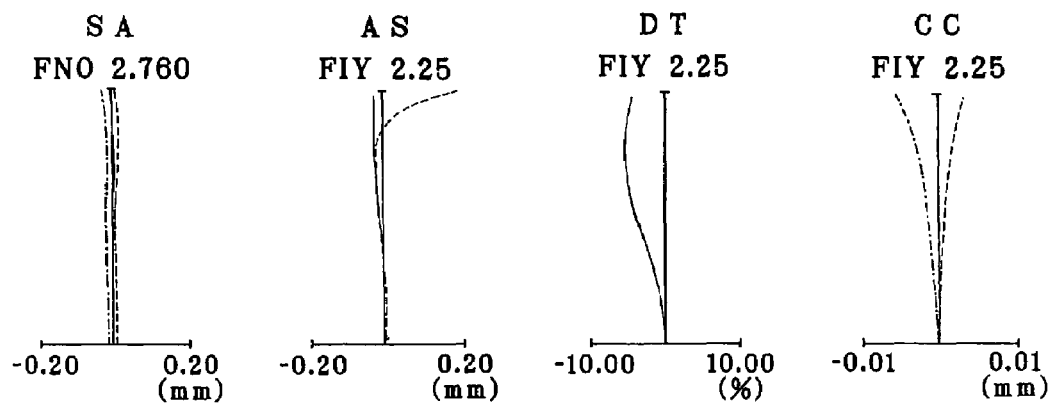
FIG. 10 is an aberration diagram for Example 4 upon focusing on an object point at infinity.
Figure 10B:
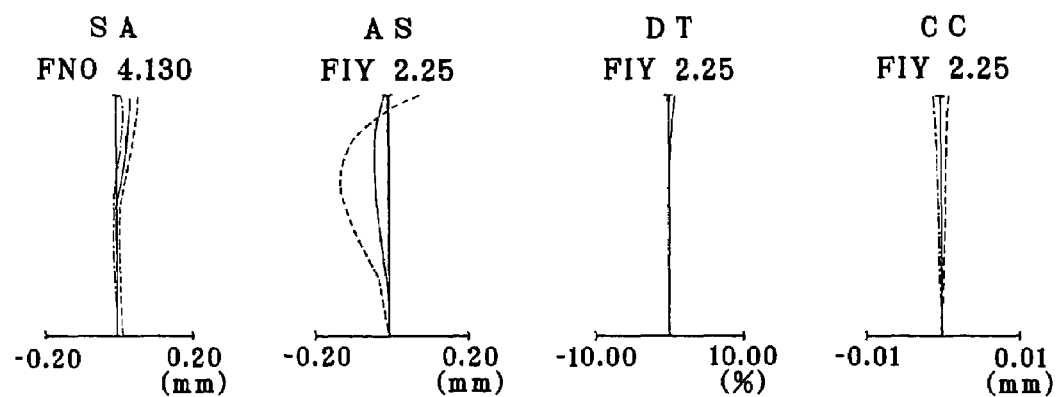
Figure 10C:
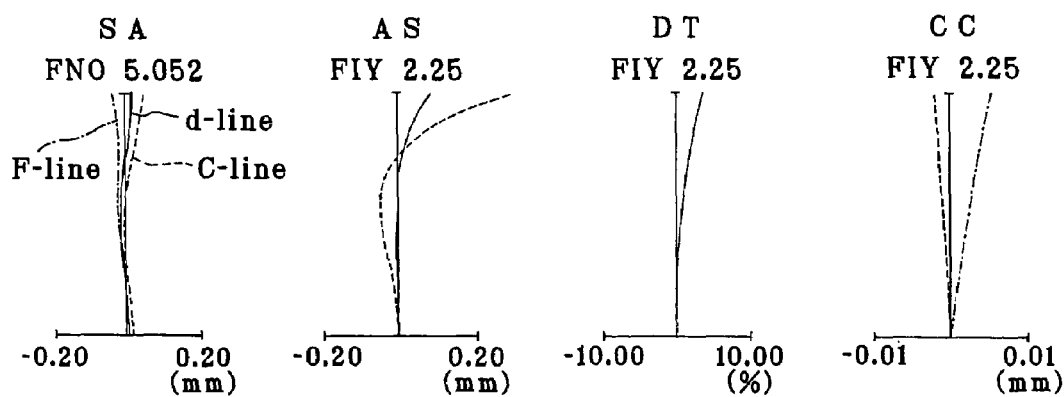
Figure 11A:
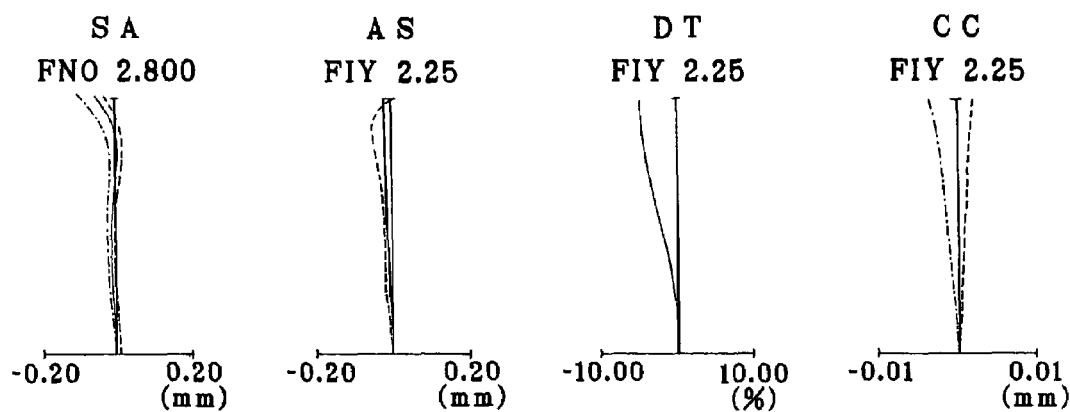
FIG. 11 is an aberration diagram for Example 5 upon focusing on an object point at infinity.
Figure 11B:
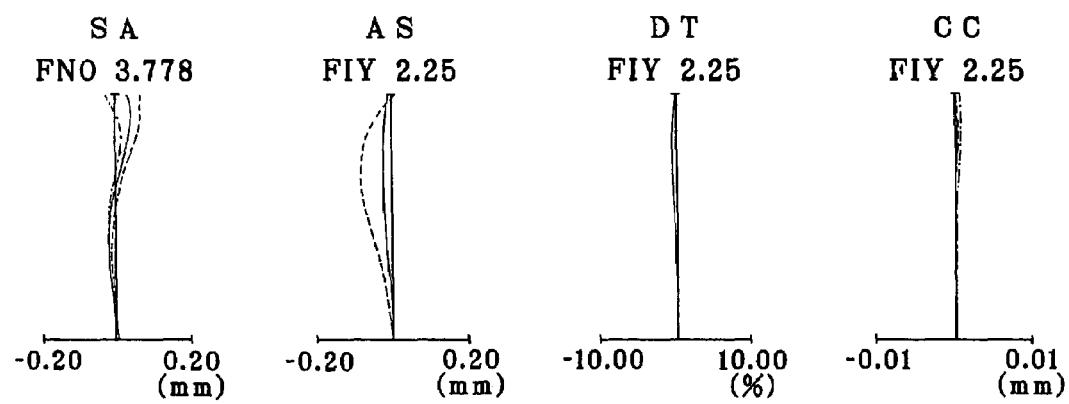
Figure 11C:
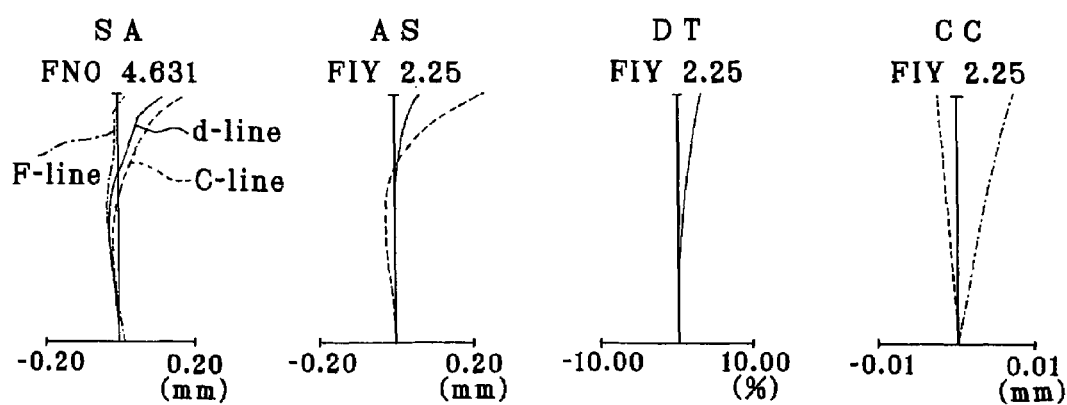
Figure 12A:
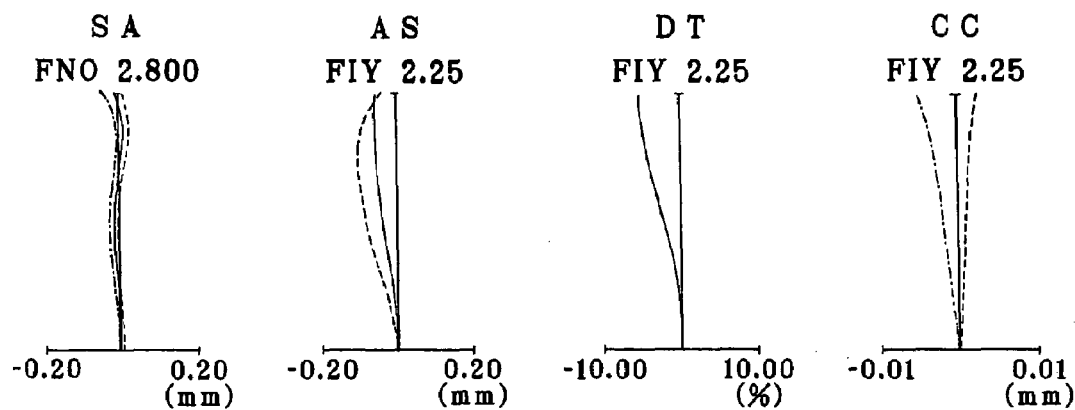
FIG. 12 is an aberration diagram for Example 6 upon focusing on an object point at infinity.
Figure 12B:
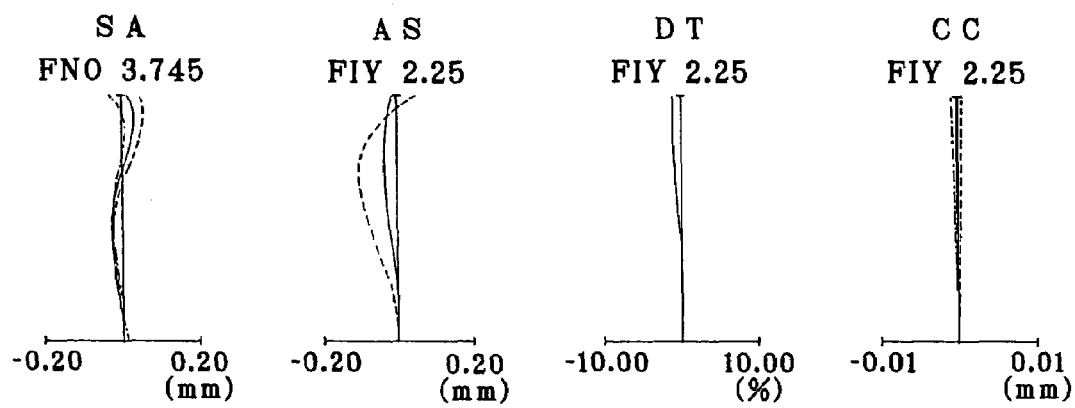
Figure 12C:
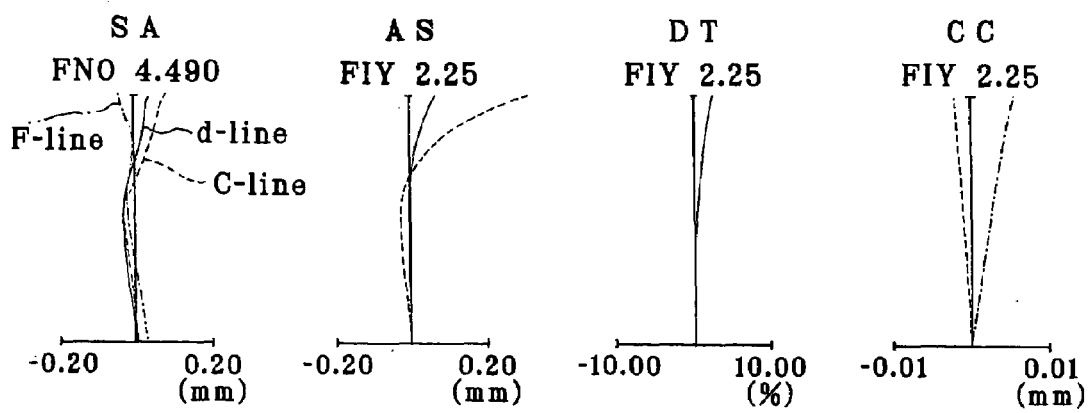

As depicted in FIG. 6, the zoom optical system of Example 6 is made up of, in order from its object side, the first lens unit G1 having negative refracting power, the aperture stop S, the second lens unit G2 having positive refracting power and the third lens unit G3 having negative refracting power. Upon zooming from the wide-angle end to the telephoto end, the first lens unit G1 remains fixed, the second lens unit G2 moves toward the object side in unison with the aperture stop S, and the third lens unit G3 moves toward the object side while its space with the second lens unit G2 becomes wide.

In order from the object side, the first lens unit G1 is composed of a negative meniscus lens having a convex surface on its object side, with its refractive index growing high with zooming from the wide-angle end to the telephoto end. The second lens unit G2 is composed of a double-convex positive lens, and the third lens unit G3 is composed of a negative meniscus lens having a convex surface on its object side. Five aspheric surfaces are used: two at both surfaces of the negative meniscus lens in the first lens unit G1, two at both surfaces of the double-convex positive lens in the second lens unit G2, and one at the image plane side-surface of the negative meniscus lens in the third lens unit G3.

Set out below are numerical data on each example, with symbols used hereinafter but not hereinbefore having the following meanings.

f: the focal length of the whole optical system;
$F_{NO}$: an F-number,
FIY: an image height,
ω: a half angle of view,
WE: the wide-angle end,
ST: an intermediate setting,
TE: the telephoto end,
$r_1$, $r_2$, etc.: the radius of curvature of each lens surface,
$d_1$, $d_2$, etc.: the space between adjacent lens surfaces,
$n_{d1}$, $n_{d2}$, etc.: the d-line refractive index of each lens, and
$v_{d1}$, $v_{d2}$, etc.: the Abbe constant of each lens.

It is here noted that aspheric shape is given by the following equation with the proviso that x is an optical axis where the direction of travel of light is taken as positive, and y is a direction orthogonal to the optical axis.

$$x=(y^2/r)/[1+\{1-(K+1)(y/r)^2\}^{1/2}]+A_2y^2+A_4y^4+A_6y^6+A_8y^8$$

Here, r is a paraxial radius of curvature, K is a conical coefficient, and $A_2$, $A_4$, $A_6$ and $A_8$ are the second-, fourth-, sixth- and eighth-order aspheric coefficients, respectively.

It is also noted that in the numerical data on each example, length is given in mm.

EXAMPLE 1

| | | | |
|---|---|---|---|
| $r_1$ = 26.751 (Aspheric) | $d_1$ = 0.50 | $n_{d1}$ = (Variable) | $v_{d1}$ = (Variable) |
| $r_2$ = 3.372 (Aspheric) | $d_2$ = (Variable) | | |
| $r_3$ = ∞ (Stop) | $d_3$ = 0.29 | | |
| $r_4$ = 2.017 (Aspheric) | $d_4$ = 0.88 | $n_{d2}$ = 1.74716 | $v_{d2}$ = 52.76 |
| $r_5$ = −5.122 (Aspheric) | $d_5$ = (Variable) | | |
| $r_6$ = 9.395 | $d_6$ = 0.54 | $n_{d3}$ = 1.84700 | $v_{d3}$ = 24.00 |
| $r_7$ = 1.928 (Aspheric) | $d_7$ = (Variable) | | |
| $r_8$ = ∞ | $d_8$ = 0.50 | $n_{d4}$ = 1.51633 | $v_{d4}$ = 64.14 |
| $r_9$ = ∞ | $d_9$ = 0.50 | | |
| $r_{10}$ = ∞ (Imaging plane) | | | |

Aspherical Coefficients

1st surface

K = 0
$A_4$ = −3.7730 × $10^{-3}$
$A_6$ = 2.3022 × $10^{-3}$
$A_8$ = −1.9976 × $10^{-4}$

2nd surface

K = 0
$A_4$ = 5.2428 × $10^{-4}$
$A_6$ = 3.6118 × $10^{-3}$
$A_8$ = 4.9284 × $10^{-4}$

4th surface

K = −1.0229
$A_4$ = 6.2154 × $10^{-3}$
$A_6$ = −5.1160 × $10^{-3}$
$A_8$ = 0.0000

5th surface

K = 0
$A_4$ = 4.3196 × $10^{-3}$
$A_6$ = −7.9105 × $10^{-3}$
$A_8$ = 2.3019 × $10^{-3}$

7th surface

K = −0.4034
$A_4$ = 3.6964 × $10^{-2}$
$A_6$ = 4.3544 × $10^{-2}$
$A_8$ = −1.6171 × $10^{-2}$

Zooming Data (∞)

| | WE | ST | TE |
|---|---|---|---|
| f (mm) | 3.60 | 5.10 | 7.20 |
| $F_{NO}$ | 2.80 | 3.81 | 4.57 |
| FIY (mm) | 2.25 | 2.25 | 2.25 |

-continued

| | | | |
|---|---|---|---|
| $d_2$ | 3.51 | 1.98 | 0.89 |
| $d_5$ | 0.11 | 0.20 | 0.37 |
| $d_7$ | 2.70 | 4.14 | 5.06 |
| $n_1$ | 1.48000 | 1.75306 | 1.82000 |
| $\nu_1$ | 56.5 | 53.3 | 52.5 |
| $f_1$ | −8.09 | −5.17 | −4.75 |
| $\phi_1$ | −0.12 | −0.19 | −0.21 |

EXAMPLE 2

| | | | |
|---|---|---|---|
| $r_1$ = 9.065 (Aspheric) | $d_1$ = 0.50 | $n_{d1}$ = (Variable) | $\nu_{d1}$ = (Variable) |
| $r_2$ = 2.565 (Aspheric) | $d_2$ = (Variable) | | |
| $r_3$ = ∞ (Stop) | $d_3$ = 0.23 | | |
| $r_4$ = 2.009 (Aspheric) | $d_4$ = 0.82 | $n_{d2}$ = 1.73792 | $\nu_{d2}$ = 53.77 |
| $r_5$ = −5.289 (Aspheric) | $d_5$ = (Variable) | | |
| $r_6$ = 27.324 | $d_6$ = 0.61 | $n_{d3}$ = 1.84700 | $\nu_{d3}$ = 24.00 |
| $r_7$ = 2.261 (Aspheric) | $d_7$ = (Variable) | | |
| $r_8$ = ∞ | $d_8$ = 0.50 | $n_{d4}$ = 1.51633 | $\nu_{d4}$ = 64.14 |
| $r_9$ = ∞ | $d_9$ = 0.50 | | |
| $r_{10}$ = ∞ (Imaging plane) | | | |

Aspherical Coefficients

1st surface $K = 0$
$A_4 = -1.1146 \times 10^{-2}$
$A_6 = 3.4522 \times 10^{-3}$
$A_8 = -3.0779 \times 10^{-4}$ 2nd surface $K = 0$
$A_4 = -1.1417 \times 10^{-2}$
$A_6 = 6.1065 \times 10^{-3}$
$A_8 = -4.6860 \times 10^{-5}$ 4th surface $K = -0.9282$
$A_4 = 7.7959 \times 10^{-3}$
$A_6 = -4.9582 \times 10^{-3}$
$A_8 = 0.0000$ 5th surface $K = 0$
$A_4 = 6.7293 \times 10^{-3}$
$A_6 = -9.2563 \times 10^{-3}$
$A_8 = 2.7121 \times 10^{-3}$ 7th surface $K = 0.5015$
$A_4 = 3.0181 \times 10^{-2}$
$A_6 = 4.3227 \times 10^{-2}$
$A_8 = -1.4779 \times 10^{-2}$

Zooming Data (∞)

| | WE | ST | TE |
|---|---|---|---|
| f (mm) | 3.60 | 5.10 | 7.20 |
| $F_{NO}$ | 2.80 | 3.75 | 4.49 |
| FIY (mm) | 2.25 | 2.25 | 2.25 |
| $d_2$ | 3.69 | 2.24 | 1.15 |
| $d_5$ | 0.23 | 0.30 | 0.45 |
| $d_7$ | 2.71 | 4.10 | 5.04 |
| $n_1$ | 1.52000 | 1.73616 | 1.78000 |
| $\nu_1$ | 50.5 | 49.6 | 49.5 |
| $f_1$ | −7.07 | −5.02 | −4.75 |
| $\phi_1$ | −0.14 | −0.20 | −0.21 |

EXAMPLE 3

| | | | |
|---|---|---|---|
| $r_1$ = 170.653 (Aspheric) | $d_1$ = 0.50 | $n_{d1}$ = 1.52542 | $\nu_{d1}$ = 55.78 |
| $r_2$ = 2.807 (Aspheric) | $d_2$ = (Variable) | | |
| $r_3$ = ∞ (Stop) | $d_3$ = 0.00 | | |
| $r_4$ = 1.898 (Aspheric) | $d_4$ = 1.14 | $n_{d2}$ = 1.58313 | $\nu_{d2}$ = 59.38 |
| $r_5$ = −2.872 (Aspheric) | $d_5$ = (Variable) | | |
| $r_6$ = 32.126 | $d_6$ = 0.50 | $n_{d3}$ = 1.60687 | $\nu_{d3}$ = 27.03 |
| $r_7$ = 1.973 (Aspheric) | $d_7$ = (Variable) | | |
| $r_8$ = ∞ | $d_8$ = 0.50 | $n_{d4}$ = 1.51633 | $\nu_{d4}$ = 64.14 |
| $r_9$ = ∞ | $d_9$ = 0.50 | | |
| $r_{10}$ = ∞ (Imaging plane) | | | |

Aspherical Coefficients

1st surface $K = 0$
$A_4 = -4.4751 \times 10^{-2}$
$A_6 = 4.4143 \times 10^{-3}$
$A_8 = 7.0371 \times 10^{-4}$ 2nd surface $K = 0$
$A_4 = -5.4025 \times 10^{-2}$
$A_6 = 5.0229 \times 10^{-3}$
$A_8 = 1.9408 \times 10^{-3}$ 4th surface $K = -1.2270$
$A_4 = 9.7027 \times 10^{-3}$
$A_6 = 1.4144 \times 10^{-2}$
$A_8 = 0.0000$ 5th surface $K = 0$
$A_4 = 6.5584 \times 10^{-2}$
$A_6 = -4.0609 \times 10^{-3}$
$A_8 = 5.2558 \times 10^{-3}$ 7th surface $K = 2.0411$
$A_4 = -8.5633 \times 10^{-2}$
$A_6 = 3.0959 \times 10^{-2}$
$A_8 = -2.9048 \times 10^{-2}$

Zooming Data (∞)

| | WE | ST | TE |
|---|---|---|---|
| f (mm) | 3.60 | 6.22 | 7.20 |
| $F_{NO}$ | 2.80 | 3.86 | 4.18 |
| ω (°) | 34.80 | 19.46 | 17.37 |
| $d_2$ | 3.17 | 1.36 | 0.88 |
| $d_5$ | 0.21 | 0.11 | 0.15 |
| $d_7$ | 2.98 | 4.89 | 5.33 |

EXAMPLE 4

| | | | |
|---|---|---|---|
| $r_1$ = 10.687 (Aspheric) | $d_1$ = (Variable) | $n_{d1}$ = 1.70269 | $\nu_{d1}$ = 49.62 |
| $r_2$ = (Variable) (Aspheric) | $d_2$ = (Variable) | | |
| $r_3$ = ∞ (Stop) | $d_3$ = 0.26 | | |
| $r_4$ = 2.058 (Aspheric) | $d_4$ = 0.81 | $n_{d2}$ = 1.74100 | $\nu_{d2}$ = 52.64 |
| $r_5$ = −5.559 (Aspheric) | $d_5$ = (Variable) | | |
| $r_6$ = 11.123 | $d_6$ = 0.82 | $n_{d3}$ = 1.84666 | $\nu_{d3}$ = 23.78 |
| $r_7$ = 1.942 (Aspheric) | $d_7$ = (Variable) | | |
| $r_8$ = ∞ | $d_8$ = 0.50 | $n_{d4}$ = 1.51633 | $\nu_{d4}$ = 64.14 |
| $r_9$ = ∞ | $d_9$ = 0.50 | | |
| $r_{10}$ = ∞ (Imaging plane) | | | |

-continued

Aspherical Coefficients

1st surface $K = 0$
$A_4 = -1.4506 \times 10^{-2}$
$A_6 = 3.3139 \times 10^{-3}$
$A_8 = -2.1979 \times 10^{-4}$ 2nd surface $K = 0$
$A_4 = $ (Variable)
$A_6 = $ (Variable)
$A_8 = $ (Variable)

4th surface $K = -1.0654$
$A_4 = 5.6061 \times 10^{-3}$
$A_6 = -4.2360 \times 10^{-3}$
$A_8 = 0.0000$ 5th surface $K = 0$
$A_4 = 6.5699 \times 10^{-3}$
$A_6 = -8.6317 \times 10^{-3}$
$A_8 = 2.3784 \times 10^{-3}$ 7th surface $K = 0.0590$
$A_4 = 2.6397 \times 10^{-2}$
$A_6 = 4.3305 \times 10^{-2}$
$A_8 = -1.5416 \times 10^{-2}$ Zooming Data ($\infty$)

| | WE | ST | TE |
|---|---|---|---|
| f (mm) | 3.60 | 5.10 | 7.20 |
| $F_{NO}$ | 2.76 | 4.13 | 5.05 |
| FIY (mm) | 2.25 | 2.25 | 2.25 |
| $d_1$ | 0.76 | 0.52 | 0.50 |
| $d_2$ | 3.73 | 2.15 | 1.05 |
| $d_5$ | 0.15 | 0.23 | 0.41 |
| $d_7$ | 1.98 | 3.72 | 4.65 |
| $r_2$ | 4.503 | 2.792 | 2.560 |
| $A_4$ (2nd surface) | $-1.6051 \times 10^{-2}$ | $-1.7286 \times 10^{-2}$ | $-1.8638 \times 10^{-2}$ |
| $A_6$ (2nd surface) | $5.6250 \times 10^{-3}$ | $5.5014 \times 10^{-3}$ | $7.2142 \times 10^{-3}$ |
| $A_8$ (2nd surface) | $-2.8595 \times 10^{-4}$ | $-1.8522 \times 10^{-3}$ | $-1.2779 \times 10^{-3}$ |
| $f_1$ | $-11.67$ | $-5.53$ | $-4.92$ |
| $\phi_1$ | $-0.09$ | $-0.18$ | $-0.20$ |

EXAMPLE 5

| | | | |
|---|---|---|---|
| $r_1 = 11.019$ (Aspheric) | $d_1 = 0.50$ | $n_{d1} = $ (Variable) | $\nu_{d1} = $ (Variable) |
| $r_2 = 2.614$ (Aspheric) | $d_2 = $ (Variable) | | |
| $r_3 = 1.950$ (Aspheric) (Stop) | $d_3 = 0.85$ | $n_{d2} = 1.76225$ | $\nu_{d2} = 51.25$ |
| $r_4 = -4.595$ (Aspheric) | $d_4 = $ (Variable) | | |
| $r_5 = 55.017$ | $d_5 = 0.50$ | $n_{d3} = 1.84700$ | $\nu_{d3} = 24.00$ |
| $r_6 = 2.126$ (Aspheric) | $d_6 = $ (Variable) | | |
| $r_7 = \infty$ | $d_7 = 0.50$ | $n_{d4} = 1.51633$ | $\nu_{d4} = 64.14$ |
| $r_8 = \infty$ | $d_8 = 0.50$ | | |
| $r_9 = \infty$ (Imaging plane) | | | |

Aspherical Coefficients

1st surface $K = 0$
$A_4 = -1.0007 \times 10^{-2}$
$A_6 = 4.2473 \times 10^{-3}$
$A_8 = -4.6301 \times 10^{-4}$ 2nd surface $K = 0$
$A_4 = -6.9714 \times 10^{-3}$
$A_6 = 7.8294 \times 10^{-3}$
$A_8 = -1.1709 \times 10^{-5}$ 3rd surface $K = -0.9283$
$A_4 = 7.1066 \times 10^{-3}$
$A_6 = -5.2297 \times 10^{-3}$
$A_8 = 0.0000$ 4th surface $K = 0$
$A_4 = 6.7535 \times 10^{-3}$
$A_6 = -9.2607 \times 10^{-3}$
$A_8 = 3.2086 \times 10^{-3}$ 6th surface $K = 0.4987$
$A_4 = 3.0255 \times 10^{-2}$
$A_6 = 5.5872 \times 10^{-2}$
$A_8 = -2.4416 \times 10^{-2}$ Zooming Data ($\infty$)

| | WE | ST | TE |
|---|---|---|---|
| f (mm) | 3.60 | 5.10 | 7.20 |
| $F_{NO}$ | 2.80 | 3.78 | 4.63 |
| FIY (mm) | 2.25 | 2.25 | 2.25 |
| $d_2$ | 3.46 | 2.12 | 1.09 |
| $d_4$ | 0.19 | 0.26 | 0.43 |
| $d_6$ | 2.70 | 3.97 | 4.83 |
| $n_1$ | 1.52000 | 1.71358 | 1.78000 |
| $\nu_1$ | 50.5 | 49.6 | 49.5 |
| $f_1$ | $-6.73$ | $-4.92$ | $-4.51$ |
| $\phi_1$ | $-0.15$ | $-0.20$ | $-0.22$ |

EXAMPLE 6

| | | | |
|---|---|---|---|
| $r_1 = 12.215$ (Aspheric) | $d_1 = 0.50$ | $n_{d1} = $ (Variable) | $\nu_{d1} = $ (Variable) |
| $r_2 = 2.770$ (Aspheric) | $d_2 = $ (Variable) | | |
| $r_3 = \infty$ (Stop) | $d_3 = 0.20$ | | |
| $r_4 = 1.995$ (Aspheric) | $d_4 = 0.91$ | $n_{d2} = 1.74817$ | $\nu_{d2} = 52.66$ |
| $r_5 = -4.908$ (Aspheric) | $d_5 = $ (Variable) | | |
| $r_6 = 20.011$ | $d_6 = 0.58$ | $n_{d3} = 1.84700$ | $\nu_{d3} = 24.00$ |
| $r_7 = 2.074$ (Aspheric) | $d_7 = $ (Variable) | | |
| $r_8 = \infty$ | $d_8 = 0.50$ | $n_{d4} = 1.51633$ | $\nu_{d4} = 64.14$ |
| $r_9 = \infty$ | $d_9 = 0.50$ | | |
| $r_{10} = \infty$ (Imaging plane) | | | |

Aspherical Coefficients

1st surface $K = 0$
$A_4 = -1.1468 \times 10^{-2}$
$A_6 = 3.6522 \times 10^{-3}$
$A_8 = -3.0836 \times 10^{-4}$ 2nd surface $K = 0$
$A_4 = -1.0914 \times 10^{-2}$
$A_6 = 5.3797 \times 10^{-3}$
$A_8 = 3.1225 \times 10^{-4}$ 4th surface $K = -0.9609$
$A_4 = 7.2013 \times 10^{-3}$ -continued $A_6 = -3.9377 \times 10^{-3}$
$A_8 = 0.0000$
5th surface $K = 0$
$A_4 = 9.4394 \times 10^{-3}$
$A_6 = -8.3009 \times 10^{-3}$
$A_8 = 2.2241 \times 10^{-3}$
7th surface $K = 0.7903$
$A_4 = 1.7506 \times 10^{-2}$
$A_6 = 4.4018 \times 10^{-2}$
$A_8 = -1.4554 \times 10^{-2}$

| Zooming Data ($\infty$) | | | |
|---|---|---|---|
| | WE | ST | TE |
| f (mm) | 3.60 | 5.10 | 7.20 |
| $F_{NO}$ | 2.80 | 3.75 | 4.49 |
| FIY (mm) | 2.25 | 2.25 | 2.25 |
| $d_2$ | 3.58 | 2.15 | 1.08 |
| $d_5$ | 0.18 | 0.25 | 0.39 |
| $d_7$ | 2.70 | 4.05 | 4.98 |
| $n_1$ | 1.52000 | 1.73279 | 1.78000 |
| $v_1$ | 50.5 | 49.6 | 49.5 |
| $f_1$ | −7.02 | −5.00 | −4.70 |
| $\phi_1$ | −0.14 | −0.20 | −0.21 |

FIGS. 7-12 are aberration diagrams for Example 1-6 upon focusing on an object point at infinity. Throughout the aberration diagrams, (a), (b) and (c) are indicative of spherical aberration (SA), astigmatism (AS), distortion (DT) and chromatic aberration of magnification (CC) at the wide-angle end, intermediate setting and telephoto end, respectively, and "FIY" and "ω" are indicative of an image height and a half angle of view, respectively.

Tabulated below are the values of conditions (1)-(8) and $f_1$ in Examples 1-6 given above.

| Condition | | Ex. 1 | Ex. 2 | Ex. 3 | Ex. 4 | Ex. 5 | Ex. 6 |
|---|---|---|---|---|---|---|---|
| (1) | | 1.52 | 1.18 | 1.13 | 1.42 | 1.08 | 1.23 |
| (2) | | 2.65 | 2.72 | 2.64 | 2.64 | 2.56 | |
| (3) | WE | 3.95 | 3.41 | 2.35 | 5.50 | 5.53 | 3.49 |
| | TE | 2.32 | 2.29 | | 2.32 | 2.37 | 2.34 |
| (3-2) | | 2.32 | 2.29 | 2.35 | 2.32 | 2.37 | 2.34 |
| (4) | | 0.54 | 0.63 | 0.55 | 0.54 | 0.59 | 0.58 |
| (5), (8) | | 0.63 | 0.63 | 0.73 | 0.72 | 0.60 | 0.66 |
| (6) | WE | −0.12 | −0.21 | | −0.09 | −0.15 | −0.14 |
| | TE | −0.21 | −0.21 | | −0.20 | −0.22 | −0.21 |
| $f_1$ | WE | −8.09 | −7.07 | | −11.67 | −6.73 | −7.02 |
| | TE | −4.75 | −4.75 | | −4.92 | −4.51 | −4.70 |
| (7) | | 1.70 | 1.49 | | 2.37 | 1.49 | 1.49 |

The invention arranged as described above may be applied to electronic taking systems where object images formed through zoom lenses are received at imaging devices such as CCDs, especially digital cameras or video cameras as well as PCs and telephone sets which are typical information processors, in particular, easy-to-carry cellular phones. Given below are some such embodiments.

Figure 13:
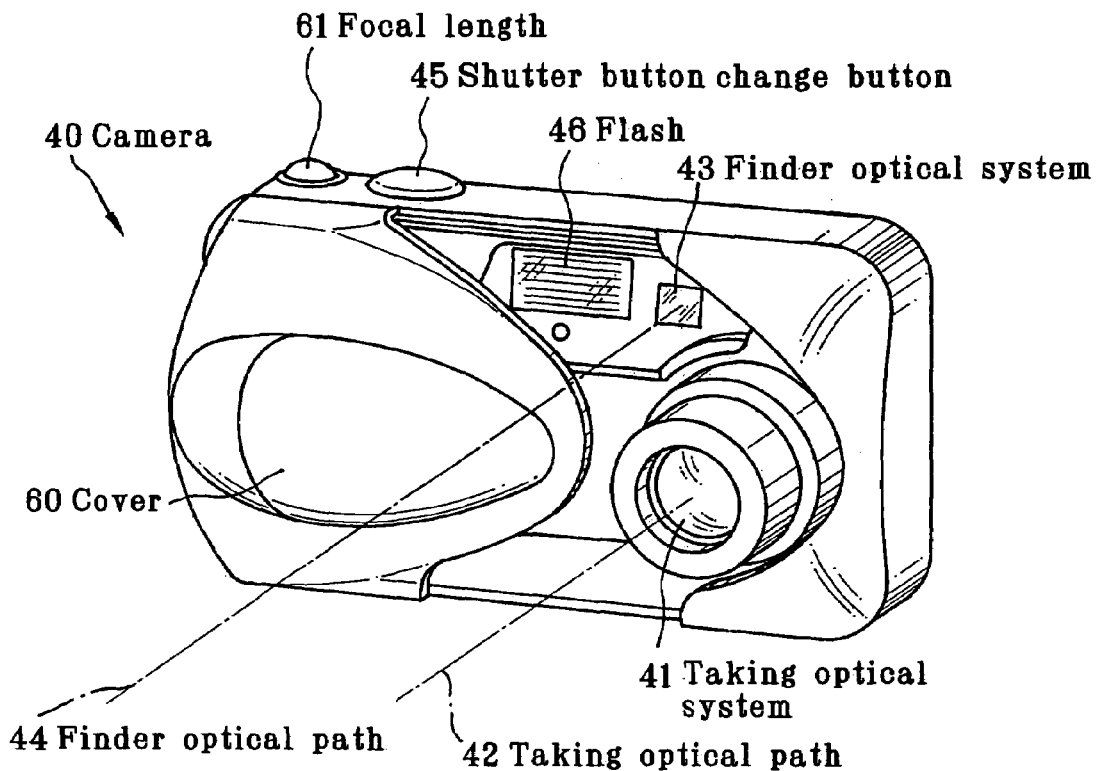
FIG. 13 is a front perspective view of the outward appearance of a digital camera in which the inventive zoom optical system is built.
Figure 14:
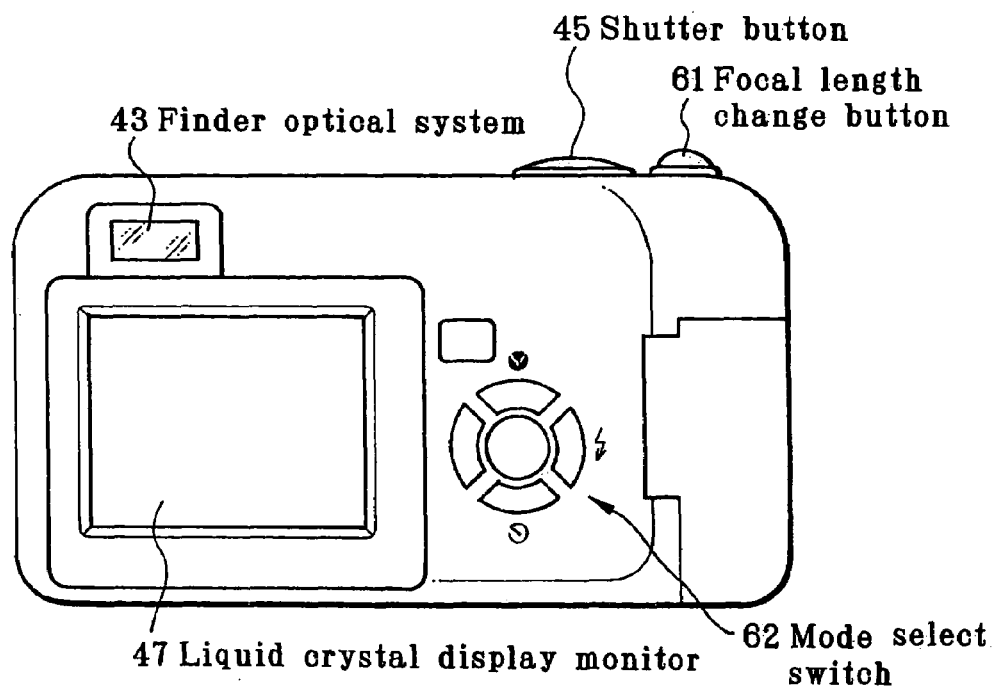
FIG. 14 is a rear perspective view of the digital camera of FIG. 13.
Figure 15:
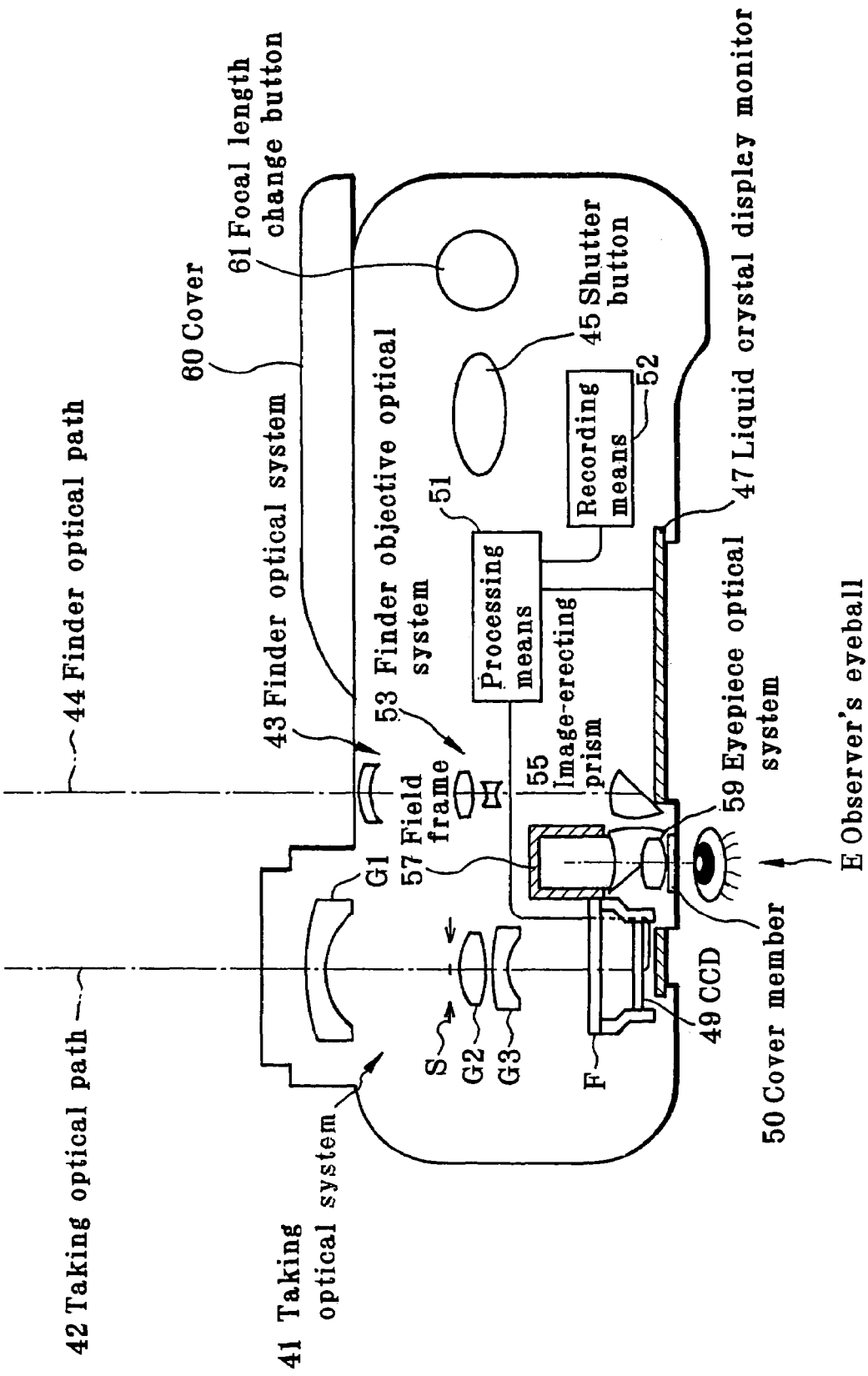
FIG. 15 is a sectional view of the digital camera of FIG. 13.

FIGS. 13, 14 and 15 are illustrative in conception of the construction of a digital camera according to the invention, in which the inventive zoom lens is built in its taking optical system 41. Specifically, FIG. 13 is a front perspective view of the appearance of a digital camera 40, FIG. 14 is a rear front view of the digital camera 40, and FIG. 15 is a schematic perspective plan view of the construction of the digital camera 40. Note here that FIGS. 13 and 15 show that the taking optical system 41 is not housed in a camera body. In this embodiment, the digital camera 40 comprises a taking optical system 41 having a taking optical path 42, a finder optical system 43 having a finder optical path 44, a shutter button 45, a flash 46, a liquid crystal display monitor 47, a focal length change button 61, a mode select switch 62 and so on. With the taking optical system 41 housed in the camera body, a cover 60 is slid over the taking optical system 41, the finder optical system 43 and the flash 46. As the cover 60 is slid open to place the camera 40 in a taking mode, the taking optical system 41 is put out of the camera body, as shown in FIG. 15. Then, as the shutter button 45 mounted on top of the camera 40 is pressed down, it causes taking to be implemented through the taking optical system 41, for instance, the zoom optical system of Example 1. An object image formed through the taking optical system 41 is then formed on the image pickup plane of CCD 49 via a low-pass filter with an IR cut coating applied on it and a cover glass F. The object image received at CCD 49 is displayed as an electronic image on the liquid crystal display monitor 47 mounted on the back surface of the camera via processing means 51. Note here that the processing means 51 could be connected with recording means 52 for recording the taken electronic image in it. Also note that the recording means 52 could be provided separately from the processing means 51 or, alternatively, it could be designed such that images are electronically recorded and written on a floppy disk, a memory card, an MO or the like. Further, a silver-halide film could be used in place of CCD 49 to set up a silver-halide camera.

Further, a finder objective optical system 53 is located on the finder optical path 44. The finder objective optical system 53 comprises a zoom optical system that is made up of a plurality of lens units (three units in the embodiment of FIGS. 13-15) and two prisms, with its focal length variable in operable association with the zoom lens in the taking optical system 41. An object image formed through the finder objective optical system 53 is formed on a field frame 57 of an erection prism 55 that is an image-erecting member. In the rear of the erection prism 55, there is an eyepiece optical system 59 located for guiding an erected image into the eyeball E of the viewer. Note here that a cover member 50 is located on the exit side of the eyepiece optical system 59.

The thus assembled digital camera 40 can be improved in performance and reduced in size, because the taking optical system 41 is of high performance and small size, and can be housed in the digital camera body.

Figure 16:
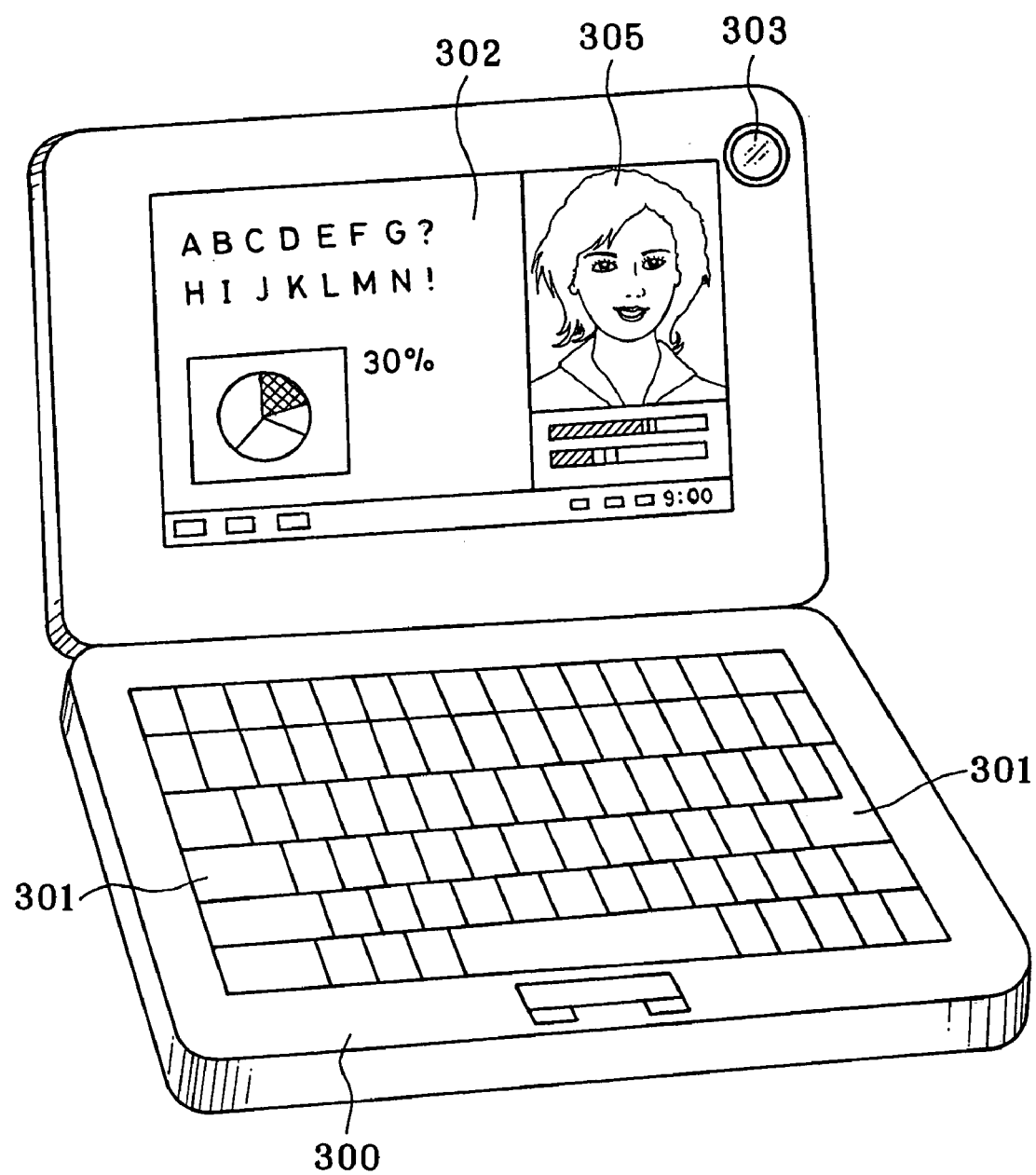
FIG. 16 is a front perspective view of a personal computer with a cover flipped up, in which the inventive zoom optical system is built as an objective optical system.
Figure 17:
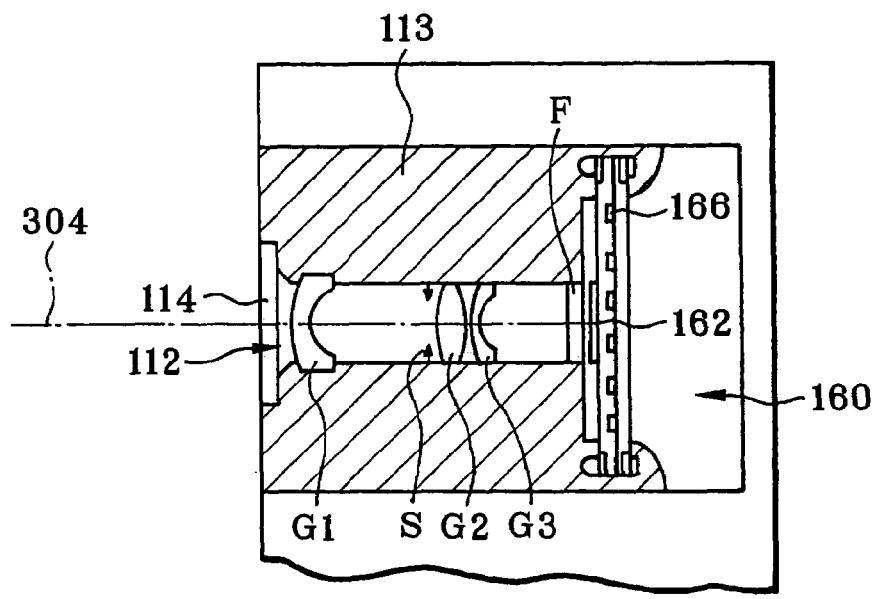
FIG. 17 is a sectional view of a taking optical system in the personal computer.
Figure 18:
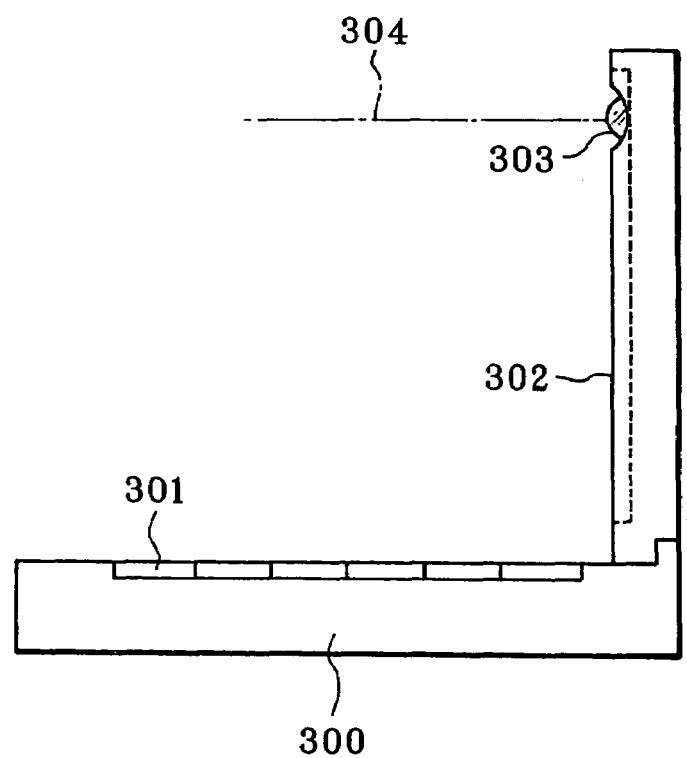
FIG. 18 is a side view of the state of FIG. 16.

FIGS. 16, 17 and 18 illustrate together a personal computer that is one embodiment of information processors in which the zoom optical system of the invention is built in the form of an objective optical system. FIG. 16 is a front perspective view of a personal computer or PC 300 with its cover flipped open, FIG. 17 is a sectional view of a taking optical system 303 in PC 300, and FIG. 18 is a side view of the FIG. 16 state. As shown in FIGS. 16, 17 and 18, PC 300 comprises a keyboard 301 for allowing an operator to enter information therein from outside, information processing and recording means (not illustrated), a monitor 302 adapted to display the information to the operator, and a taking optical system 303 for taking an image of the operator and nearby images. The monitor 302 used herein may be a transmission type liquid crystal display illuminated from its back side by means of a backlight (not shown), a reflection type liquid crystal display designed to reflect light from its front side for display purposes, a CRT display or the like. As shown, the taking optical system 303 is built in the right upper portion of the monitor 302; however, it could be located at any desired position, for instance, around the monitor 302 or the keyboard 301.

This taking optical system 303 comprises an objective lens 112 mounted on a taking optical path 304 and formed of the zoom lens of the invention (roughly shown) and an image pickup chip 162 for receiving images, which are built in PC 300.

In this embodiment, an optical low-pass filter F is additionally applied onto the image pickup chip 162 to form a one-piece image pickup unit 160 that can be mounted at the rear end of the lens barrel 113 of the objective lens 112 in one-touch snap operation. Thus, any centering or surface-to-surface alignment for the objective lens 112 and image pickup chip 162 can be dispensed with, and so smooth assembly is achieved. Further, the lens barrel 113 is provided at the other end with a cover glass 114 for protection of the objective lens 112. Note here that the zoom lens drive mechanism in the lens barrel 113 is not shown.

An object image received at the image pickup chip 162 is entered into the processing means of PC 300 via a terminal 166 and displayed as an electronic image on the monitor 302. As an example, an image 305 taken of the operator is shown in FIG. 16. The image 305 may be displayed on a personal computer on the other end of the line by way of processing means and the Internet or a telephone.

Figure 19A:
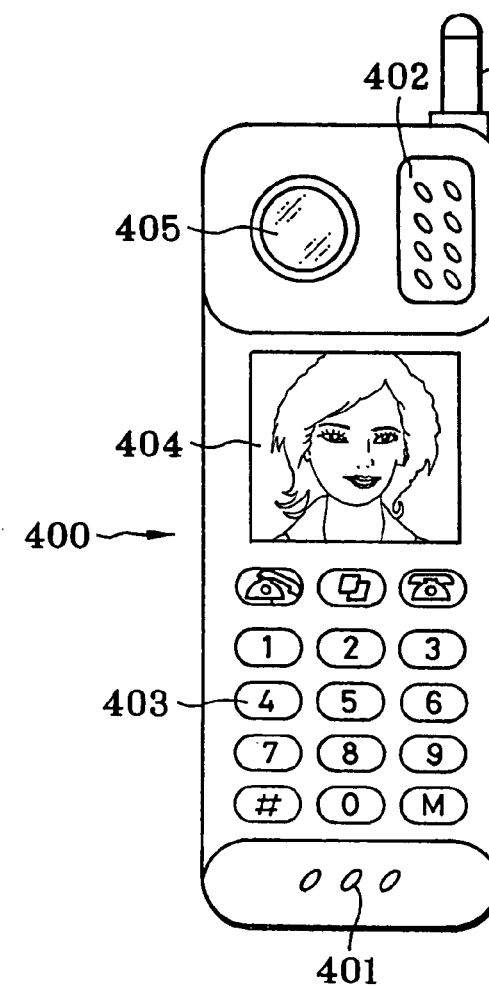
FIGS. 19(a) and 19(b) are a front view and a side view of a cellular phone in which the inventive zoom optical system is built as an objective optical system.
Figure 19B:
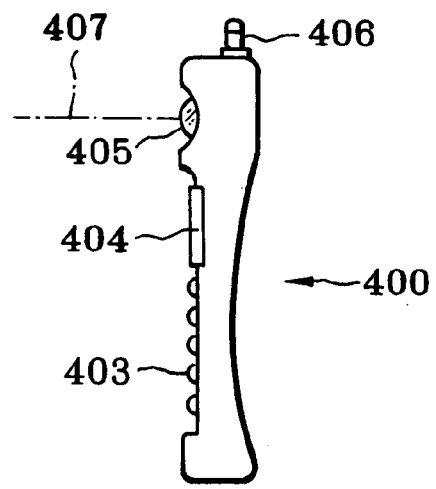
Figure 19C:
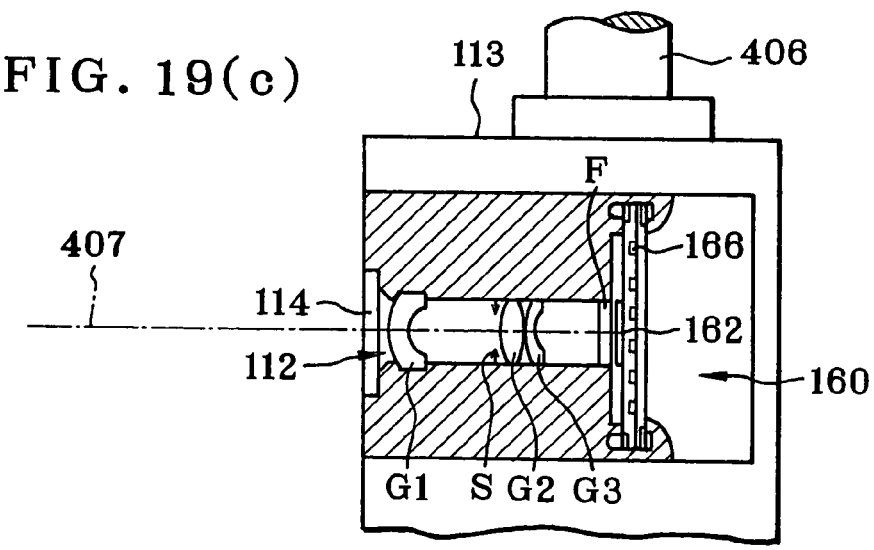
FIG. 19(c) is a sectional view of a taking optical system inside.

FIG. 19 is illustrative of a telephone set, especially a convenient-to-carry cellular phone that is one exemplary information processor in which the zoom lens of the invention is built as a taking optical system. FIGS. 19(a) and 19(b) are a front view and a side view of a cellular phone 400, and FIG. 19(c) is a sectional view of a taking optical system 405. As depicted in FIGS. 19(a) to 19(c), the cellular phone 400 comprises a microphone 401 through which the voice of the operator is entered as information, a speaker 402 through which the voice of a person on the other end or the like is produced, an input dial 403 through which the information is entered by the operator, a monitor 404 for displaying images taken of the operator, the person on the other end of the line and so on as well as information such as telephone numbers, a taking optical system 405, an antenna 406 for transmission and reception of communications waves, and processing means (not shown) for processing image information, communications information, input signals, etc. Here a liquid crystal display is used for the monitor 404. How the respective components are positioned is not particularly limited to the arrangement shown in FIG. 19. This taking optical system 405 comprises an objective lens 112 mounted on a taking optical path 407 and formed of the zoom lens of the invention (roughly shown) and an image pickup chip 162 for receiving object images, which are built in the cellular phone 400.

In this embodiment, an optical low-pass filter F is additionally applied onto the image pickup chip 162 to form a one-piece unit 160 that can be mounted at the rear end of the lens barrel 113 of the objective lens 112 in one-touch snap operation. Thus, any centering or surface-to-surface alignment for the objective lens 112 and image pickup chip 162 can be dispensed with, and so smooth assembly is achieved. Further, the lens barrel 113 is provided at the other end with a cover glass 114 for protection of the objective lens 112. It is here noted that the zoom lens drive mechanism in the lens barrel 113 is not shown.

An object image received at the image pickup device 162 is entered into processing means (not shown) via a terminal 166, so that the image is displayed as an electronic image on the monitor 404 and/or a monitor on the other end of the line. To transmit the image to the person on the other end, the signal processing means has a signal processing function of converting information on the object image received at the image pickup chip 162 to transmittable signals.

Note here that if, in each example, filters such as the low-pass filter are removed off, then the camera can be much more slimmed down upon received in the camera housing.

According to the embodiments of the invention as described above, it is possible to provide a zoom optical system that is of small-format size and high image quality performance comparable to the SXGA class (having about 1,000,000 pixels), and electronic equipment with a built-in zoom optical system that is of small-format size and high image quality performance comparable to the SXGA class (having about 1,000,000 pixels).

I claim:

1. A zoom optical system comprising, in order from an object side thereof,
a first lens unit of negative refracting power,
a second lens unit of positive refracting power and
a third lens unit of negative refracting power in which zooming is implemented by movement of at least the second lens unit and the third lens unit thereby varying a space between adjacent lens units, wherein:
said negative first lens unit comprises one negative lens element,
said positive second lens unit comprises one positive lens element,
said negative third lens unit comprises one negative lens element,
a total number of lenses included in said zoom optical system is 3, and
the negative lens element in said third lens unit is of negative meniscus shape with a concave surface on an image plane side.

2. The zoom optical system according to claim 1, wherein a shape factor of the negative lens element in said third lens unit satisfies the following condition (1):

$$0.7<(r_6+r_7)/(r_6-r_7)<2.0 \quad (1)$$

where $r_6$ and $r_7$ are axial radii of curvature of an object side-surface and an image plane side-surface of the negative lens element in the third lens unit, respectively.

3. The zoom optical system according to claim 1, wherein a whole length of the optical system satisfies the following condition (2):

$$1.9<TL_w/f_w<3.1 \quad (2)$$

where $TL_w$ is the whole length of the optical system at a wide-angle end, and $f_w$ is a focal length of the whole optical system at a wide-angle end.

4. The zoom optical system according to claim 1, which satisfies the following condition (3):

$$1.8<|f_1|/f_2<6.5 \quad (3)$$

where $f_1$ is a focal length of the first lens unit, and $f_2$ is a focal length of the second lens unit.

5. The zoom optical system according to claim 1, wherein the negative lens element in said third lens unit satisfies the following condition (4):

$$0.4<r_7/f_w<1.0 \quad (4)$$

where $r_7$ is an axial radius of curvature of an image plane side-surface of the negative lens element in the third lens unit, and $f_w$ is a focal length of the whole optical system at a wide-angle end.

6. The zoom optical system according to claim 1, which satisfies the following condition (5):

$$0.4 < (G23L)/Y' < 1.1 \quad (5)$$

where Y' is a maximum image height, and G23L is a total axial thickness of all lens elements included in the second lens unit and the third lens unit.

7. The zoom optical system according to claim 1, wherein the negative lens element in said first lens unit is a variable refracting power optical element.

8. The zoom optical system according to claim 7, wherein focusing is implemented by changing a refracting power of said variable refracting power optical element.

9. The zoom optical system according to claim 1, wherein focusing is implemented by movement of the negative lens element in said first lens unit.

10. An imaging system, comprising the zoom optical system according to claim 1 and an imaging device located on an image side of said zoom optical system.

11. A zoom optical system comprising, in order from an object side thereof,
    a first lens unit of negative refracting power,
    a second lens unit of positive refracting power and
    a third lens unit of negative refracting power in which zooming is implemented by movement of at least the second lens unit and the third lens unit thereby varying a space between adjacent lens units, wherein:
    said negative first lens unit comprises one negative lens element,
    said positive second lens unit comprises one positive lens element,
    said negative third lens unit comprises one negative lens element,
    a total number of lenses from the first to the third lens unit in said zoom optical system is 3,
    the negative lens element in said third lens unit is of negative meniscus shape with a concave surface on an image plane side,
    the negative lens element in said first lens unit is a variable refracting power optical element, and
    wherein said variable refracting power optical element satisfies the following condition (6):

$$0.07 < |\Phi_1| < 0.27 \quad (6)$$

where $\Phi_1$ is a refracting power of the variable refracting power optical element.

12. A zoom optical system comprising, in order from an object side thereof,
    a first lens unit of negative refracting power,
    a second lens unit of positive refracting power and
    a third lens unit of negative refracting power in which zooming is implemented by movement of at least the second lens unit and the third lens unit thereby varying a space between adjacent lens units, wherein:
    said first lens unit comprises at least one variable refracting power optical elements,
    a total number of lens units included in said zoom optical system is 3, and
    said zoom optical system is a three-unit zoom optical system.

13. The zoom optical system according to claim 12, which satisfies the following condition (3):

$$1.8 < |f_1|/f_2 < 6.5 \quad (3)$$

where $f_1$ is a focal length of the first lens unit, and $f_2$ is a focal length of the second lens unit.

14. The zoom optical system according to claim 12, wherein:
    said negative first lens unit comprises one negative lens element,
    said positive second lens unit comprises one positive lens element,
    said negative third lens unit comprises one negative lens element,
    a total number of lenses from the first to the third lens unit in the zoom optical system is 3, and
    the negative lens in the third lens unit is of negative meniscus shape with a concave surface on an image plane side thereof.

15. The zoom optical system according to claim 12, wherein said third lens unit comprises a negative lens element having a shape factor that satisfies the following condition (1):

$$0.7 < (r_6 + r_7)/(r_6 - r_7) < 2.0 \quad (1)$$

where $r_6$ and $r_7$ are axial radii of curvature of an object side-surface and an image plane side-surface of the negative lens element in the third lens unit, respectively.

16. The zoom optical system according to claim 12, wherein said third lens unit comprises a negative lens element that satisfies the following condition (4):

$$0.4 < r_7/f_w < 1.0 \quad (4)$$

where $r_7$ is an axial radius of curvature of an image plane side-surface of the negative lens in the third lens unit, and $f_w$ is a focal length of the whole optical system at a wide-angle end.

17. The zoom optical system according to claim 12, wherein said second lens unit and said third lens unit each comprises a lens element, and satisfy the following condition (8):

$$0.4 < (G23L)/Y' < 0.9 \quad (8)$$

where Y' is a maximum image height, and G23L is a total axial thickness of all lens elements included in the second lens unit and the third lens unit.

18. The zoom optical system according to claim 12, wherein said first lens unit comprises a negative lens element adapted to move during focusing.

19. The zoom optical system according to claim 12, wherein focusing is implemented by changing a refracting power of said variable refracting power optical element.

20. An imaging system, comprising the zoom optical system according to claim 12 and an imaging device located on an image side of said zoom optical system.

21. A zoom optical system comprising, in order from an object side thereof,
    a first lens unit of negative refracting power,
    a second lens unit of positive refracting power and
    a third lens unit of negative refracting power in which zooming is implemented by movement of at least the second lens unit and the third lens unit thereby varying a space between adjacent lens units,
    wherein said first lens unit comprises at least one variable refracting power optical element, and
    wherein said first lens unit satisfies the following condition (7):

$$1.15 < |f_1(W)/f_1(t)| < 3.2 \quad (7)$$

where $f_1(w)$ is a focal length of the first lens unit at a wide-angle end, and $f_1(t)$ is a focal length of the first lens unit at a telephoto end.

22. A zoom optical system comprising, in order from an object side thereof, a first lens unit of negative refracting power, a second lens unit of positive refracting power and a third lens unit of negative refracting power in which zooming is implemented by movement of at least the second lens unit and the third lens unit thereby varying a space between adjacent lens units, wherein said first lens unit comprises at least one variable refracting power optical element, and wherein said variable refracting power optical element satisfies the following condition (6):

$$0.07 < |\Phi_1| < 0.27 \tag{6}$$

where $\Phi_1$ is a refracting power of the variable refracting power optical element.

* * * * *